United States Patent
Jang et al.

(10) Patent No.: US 8,556,442 B2
(45) Date of Patent: Oct. 15, 2013

(54) BACKLIGHT UNIT AND DISPLAY APPARATUS USING THE SAME

(75) Inventors: Ji Won Jang, Seoul (KR); Sung Yong Park, Seoul (KR); Se Jin Ko, Seoul (KR); Sung Ho Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 306 days.

(21) Appl. No.: 13/157,824

(22) Filed: Jun. 10, 2011

(65) Prior Publication Data

US 2012/0134139 A1 May 31, 2012

(30) Foreign Application Priority Data

Nov. 25, 2010 (KR) .................. 10-2010-0118022
May 2, 2011 (KR) .................. 10-2011-0041495

(51) Int. Cl.
*G02F 1/13357* (2006.01)
(52) U.S. Cl.
USPC ......... 362/97.1; 362/97.3; 362/609; 362/241; 362/346; 362/298
(58) Field of Classification Search
USPC ............ 362/97.1–97.4, 609, 560, 612, 613, 362/217.05, 224, 225, 241, 247, 297, 298, 362/346, 301
See application file for complete search history.

(56) References Cited

U.S. PATENT DOCUMENTS

| | | | |
|---|---|---|---|
| 4,989,122 A * | 1/1991 | Allekotte et al. | 362/97.1 |
| 7,600,908 B2 * | 10/2009 | Chang et al. | 362/623 |
| 8,235,540 B2 * | 8/2012 | Park et al. | 362/97.1 |
| 8,366,308 B2 * | 2/2013 | Chiu et al. | 362/621 |
| 2004/0065894 A1 | 4/2004 | Hashimoto et al. | 257/100 |
| 2004/0211970 A1 | 10/2004 | Hayashimoto et al. | 257/98 |
| 2007/0171626 A1 * | 7/2007 | Chang | 362/97 |
| 2007/0171676 A1 * | 7/2007 | Chang | 362/613 |
| 2009/0323311 A1 * | 12/2009 | Mezouari | 362/97.1 |
| 2010/0226119 A1 * | 9/2010 | Liao et al. | 362/97.1 |
| 2011/0211335 A1 * | 9/2011 | Ko | 362/97.1 |

FOREIGN PATENT DOCUMENTS

| | | |
|---|---|---|
| EP | 1 670 069 A1 | 6/2006 |
| JP | 2002-033011 A | 1/2002 |
| JP | 2004-288498 A | 10/2004 |
| JP | 2006-267991 A | 10/2006 |
| JP | 2009-205969 A | 9/2009 |
| JP | 2010-225395 A | 10/2010 |
| KR | 10-2006-0078576 A | 7/2006 |
| KR | 10-0610614 B1 | 8/2006 |
| KR | 10-0732267 B1 | 6/2007 |
| KR | 10-2007-0099791 A | 10/2007 |
| KR | 10-0826581 B1 | 4/2008 |
| KR | 10-2008-0038669 A | 5/2008 |
| KR | 10-2009-0072018 A | 7/2009 |
| KR | 10-2010-0135484 A | 12/2010 |
| WO | WO 2008/047284 A2 | 4/2008 |

OTHER PUBLICATIONS

European Search Report dated Dec. 6, 2011 issued in Application No. 11 16 9545.

* cited by examiner

*Primary Examiner* — Bao Q Truong
(74) *Attorney, Agent, or Firm* — Ked & Associates LLP

(57) ABSTRACT

A backlight unit and a display apparatus using the same are disclosed. The backlight unit includes a first reflector, a second reflector partially having an inclined surface, a plurality of light sources disposed between the first reflector and the second reflector, and a third reflector disposed between adjacent light sources.

20 Claims, 54 Drawing Sheets

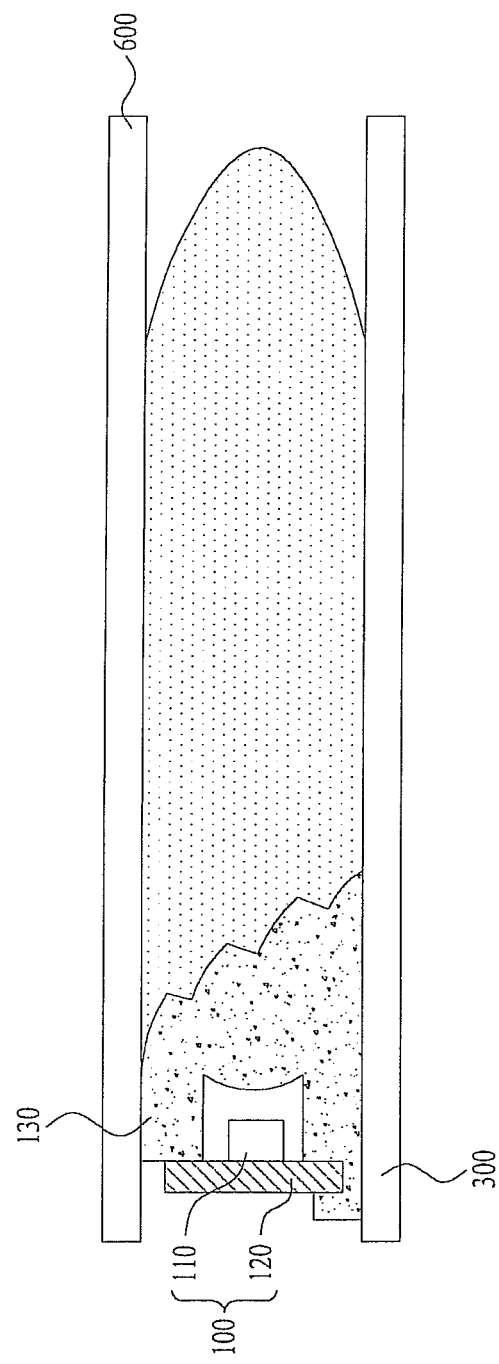

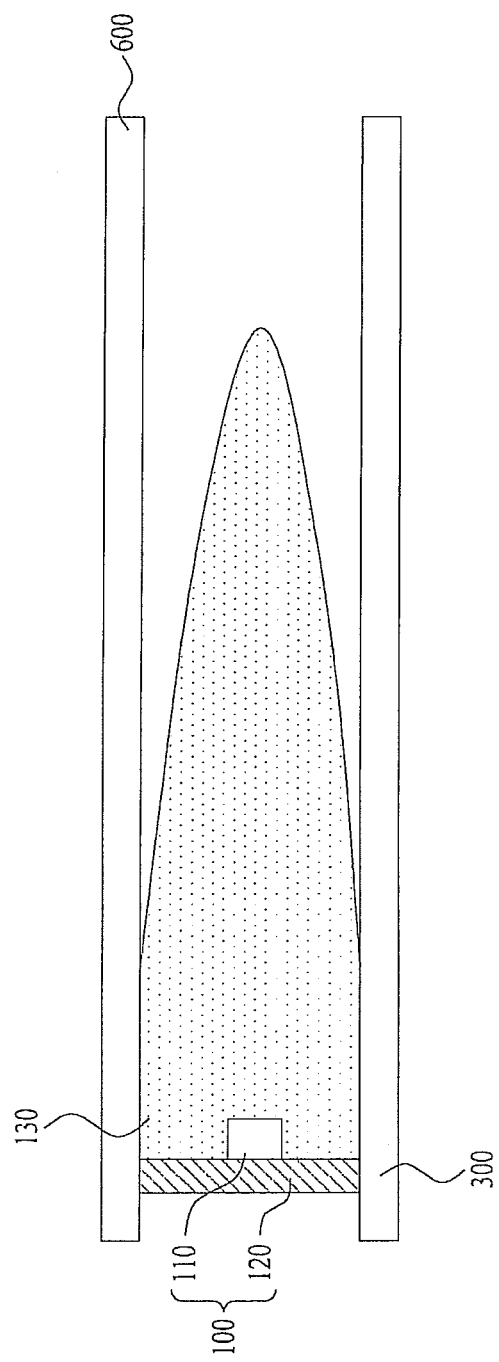

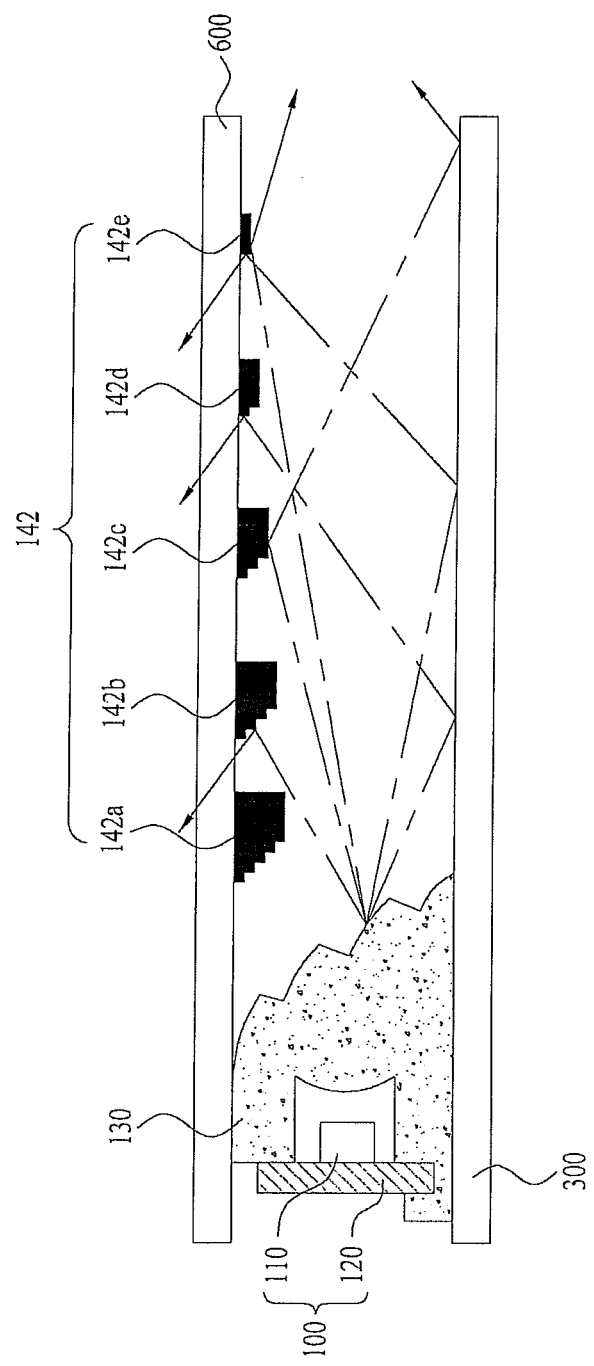

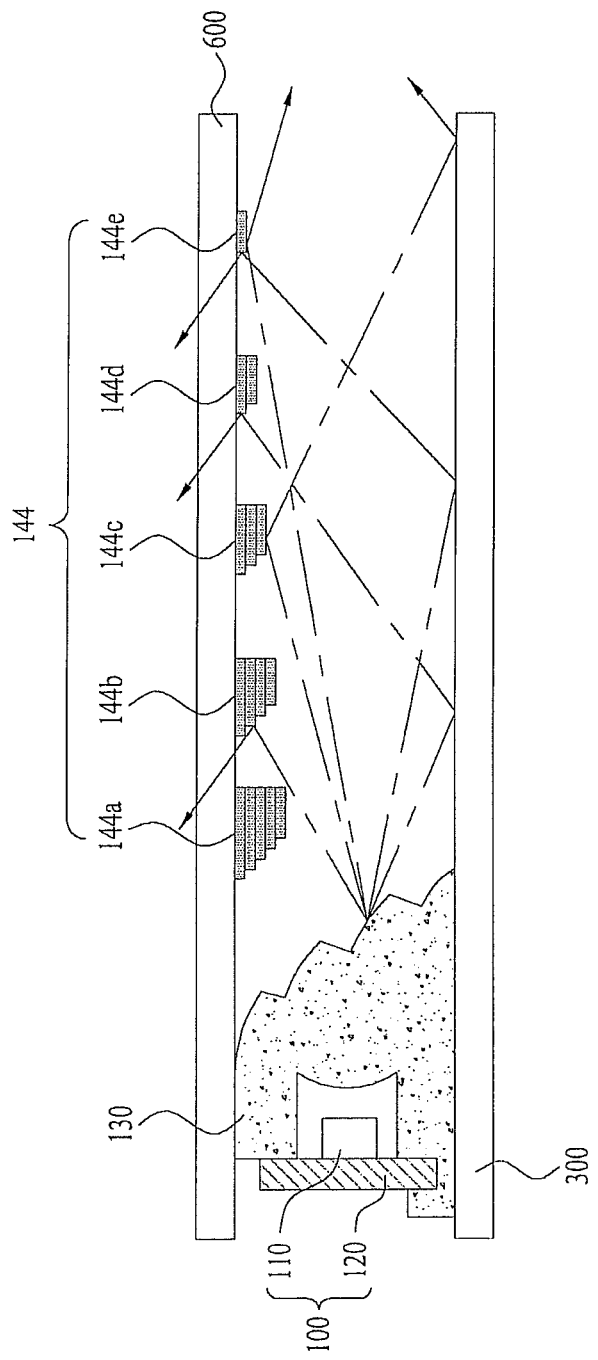

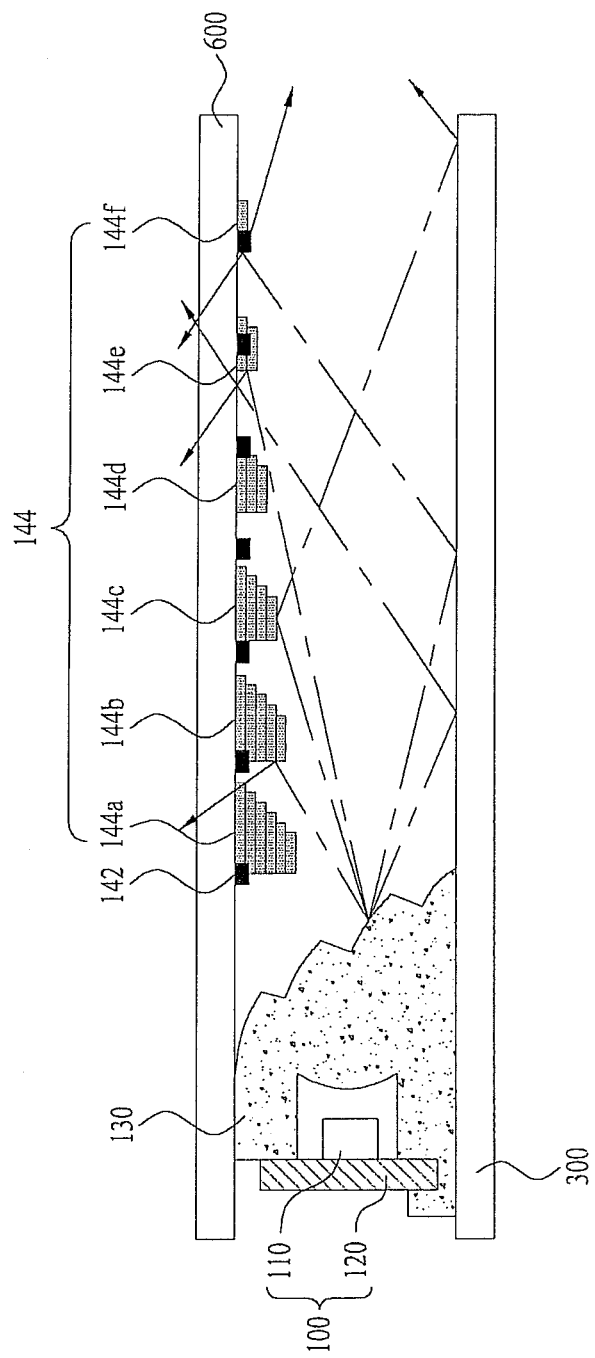

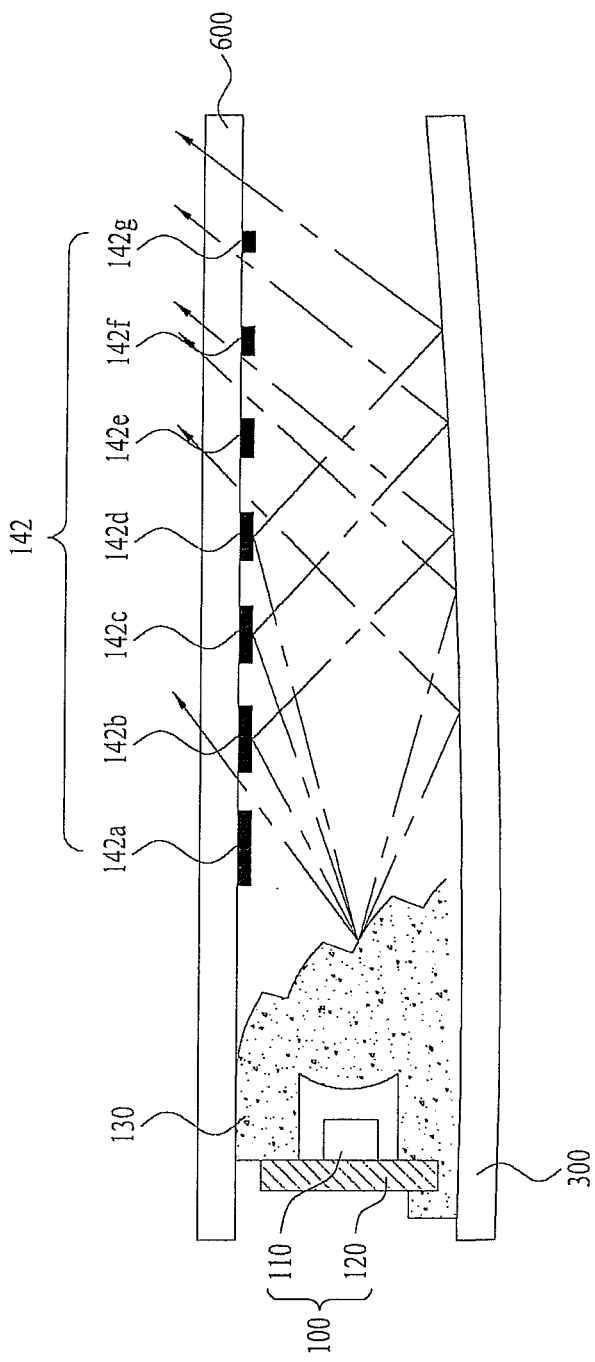

BACKLIGHT UNIT AND DISPLAY APPARATUS USING THE SAME

This application claims the benefit of Korean Patent Application No. P2010-0118022, filed on, Nov. 25, 2010, and Patent Application No. P2011-0041495, filed on May 2, 2011, which are hereby incorporated by reference as if fully set forth herein.

BACKGROUND OF THE INVENTION

1. Field of the Invention

Embodiments relate to a backlight unit and a display apparatus using the same.

2. Discussion of the Related Art

Generally, representative large-scale display apparatuses include Liquid Crystal Displays (LCDs), Plasma display Panels (PDPs), etc.

Unlike self-emission type PDPs, LCDs essentially need a separate backlight unit due to absence of self light emitting devices.

Backlight units for use in LCDs are classified into edge type backlight units and vertical type backlight units according to positions of light sources. In an edge type backlight unit, light sources are disposed at left and right edges or upper and lower edges of an LCD panel and a light guide plate is provided to uniformly distribute light throughout a surface of the LCD panel, which ensures uniform luminance and enables production of an extremely thin display panel.

A vertical type backlight unit is generally applied to displays of 20 inches or more. The vertical type backlight unit advantageously has greater light efficiency than the edge type backlight unit owing to a plurality of light sources being disposed below a panel and thus, is mainly used in a large-scale display requiring high luminance.

Conventional edge type or vertical type backlight units adopt Cold Cathode Fluorescent Lamps (CCFL) as a light source.

The backlight units using CCFLs, however, have several disadvantages, such as consumption of a great quantity of power because power should always be applied to a CCFL, low color reproduction efficiency of about 70% that of a Cathode Ray Tube (CRT), and environmental pollution due to use of mercury.

Currently, backlight units using Light Emitting Diodes (LEDs) are being studied as a solution to the above described problems.

In the case of backlight units using LEDs, turning on or off a part of an LED array is possible, which can achieve remarkable reduction in power consumption. In particular, RGB LEDs exhibit color reproduction beyond 100% of a color reproduction range proposed by the National Television System Committee (NTSC) and can provide more vivid images to consumers.

Further, LEDs fabricated through semiconductor processes are environmentally friendly.

Although LCD products using LEDs having the above described advantages have been introduced, these LCD products need expensive drivers, PCBs, etc. because LEDs have a driving mechanism different from conventional CCFLs.

For this reason, LED backlight units are applied only to high-price LCD products at present.

SUMMARY OF THE INVENTION

An object of the present invention is to provide a backlight unit, which includes an air guide and has uniform luminance owing to a reflector disposed between adjacent light sources, and a display apparatus using the backlight unit.

To achieve these objects and other advantages and in accordance with the purpose of the invention, as embodied and broadly described herein, a backlight unit includes a first reflector, a second reflector partially having an inclined surface, a plurality of light sources disposed between the first reflector and the second reflector, and a third reflector disposed between adjacent light sources.

The third reflector may be spaced apart from the first reflector by a first distance and may be spaced apart from the second reflector by a second distance. The first distance and the second distance may be different.

The third reflector may come into contact with the first reflector while being spaced apart from the second reflector, or may come into contact with both the first reflector and the second reflector.

One or a plurality of third reflectors may be disposed between adjacent light sources, and one or a plurality of light sources may be disposed between adjacent third reflectors.

The third reflector may include first and second segments disposed at opposite sides of the light source, and a third segment connected to the first and second segments and located between the first reflector and the light source.

The third reflector may be disposed to surround the periphery of a corresponding one of the light sources.

The third reflector may partially or wholly overlap with the first reflector.

The inclined surface of the second reflector may have a predetermined gradient with respect to a surface of the first reflector, and the inclined surface of the second reflector may overlap with the first reflector.

The second reflector may include at least one inclined surface and at least one horizontal surface and the horizontal surface of the second reflector may be parallel to the first reflector.

The second reflector may include at least two inclined surfaces having at least one inflection point, and the first and second inclined surfaces adjacent to each other about the inflection point have different curvatures.

The light source may include a lens having at least one first surface, an incidence angle of which is equal to or greater than a critical angle, and at least one second surface, an incidence angle of which is less than the critical angle.

The lens may be made of a polymer material having an index of refraction of 1 or more.

In accordance with another aspect of the present invention, a backlight unit includes a first reflector, a second reflector partially having an inclined surface, a light source module disposed between the first reflector and the second reflector and having a plurality of light sources disposed on a board, and a third reflector disposed between adjacent light sources and configured to protrude from the board.

BRIEF DESCRIPTION OF THE DRAWINGS

Arrangements and embodiments may be described in detail with reference to the following drawings in which like reference numerals refer to like elements and wherein:

FIG. 30A is a view illustrating light distribution of a backlight unit having a lens;

FIG. 30B is a view illustrating light distribution of a backlight unit having no lens;

FIGS. 31A to 31F are views illustrating other embodiments of FIG. 28A;

FIGS. 32A and 32B are views illustrating other embodiments of FIG. 28A; and

DETAILED DESCRIPTION OF THE INVENTION

Reference will now be made in detail to the preferred embodiments of the present invention, examples of which are illustrated in the accompanying drawings.

Prior to description of the embodiments, it will be understood that, when each element is referred to as being formed "on" or "under" the other element, it can be directly "on" or "under" the other element or be indirectly formed with intervening one or more other elements therebetween.

The terms "on" or "under" may indicate either a downward direction or an upward direction when reinforcing a single element.

Figure 1A:
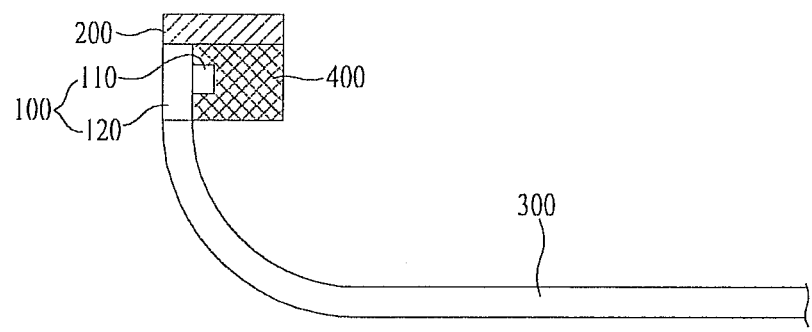
FIGS. 1A to 1C are views explaining a backlight unit in accordance with an embodiment.
Figure 1B:
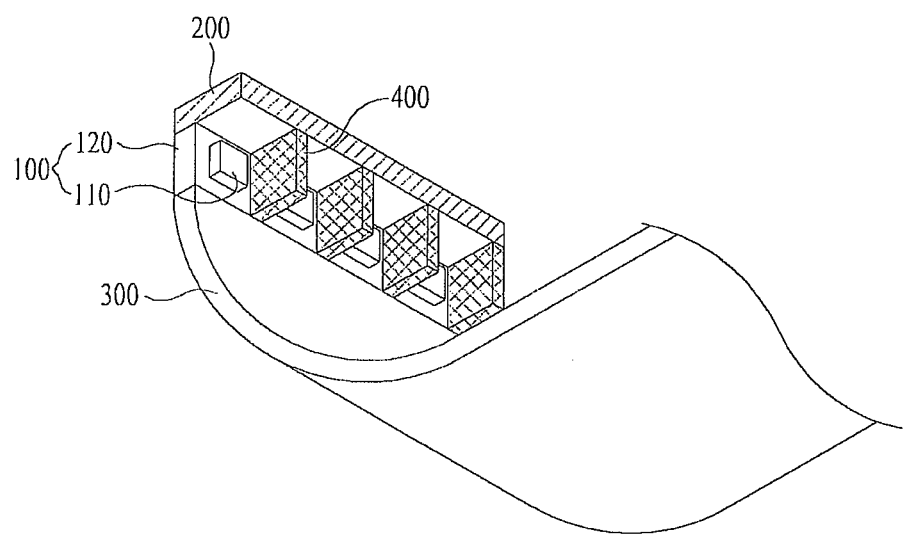
Figure 1C:
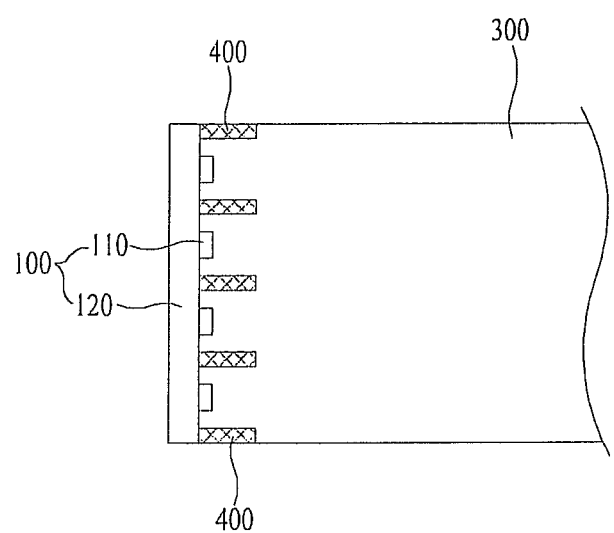

FIGS. 1A to 1C are views explaining a backlight unit in accordance with an embodiment. FIG. 1A is a sectional view, FIG. 1B is a bottom perspective view and FIG. 1C is a plan view.

As illustrated in FIGS. 1A to 1C, the backlight unit may include a light source module 100 including at least one light source 110 and a circuit board 120, a first reflector 200, a second reflector 300 and a third reflector 400.

The light source module 100 may be located between the first reflector 200 and the second reflector 300, and may be disposed close to the first reflector 200 or the second reflector 300.

As occasion demands, the light source module 100 may come into contact with the first reflector 200 while being spaced apart from the second reflector 300 by a predetermined distance, or may come into contact with the second reflector 300 while being spaced apart from the first reflector 200 by a predetermined distance.

Alternatively, the light source module 100 may be spaced apart from both the first reflector 200 and the second reflector 300 by predetermined distances, or may come into contact with both the first reflector 200 and the second reflector 300.

The light source module 100 may include the circuit board 120 having an electrode pattern and the light source 110 to generate light.

In this case, the at least one light source 110 may be mounted on the circuit board 120, and the electrode pattern formed on the circuit board 120 may connect the light source 110 to a power supply adaptor.

For example, a carbon nanotube electrode pattern may be formed on an upper surface of the circuit board 120 so as to connect the light source 110 and the adaptor to each other.

The circuit board 120 may be a Printed Circuit Board (PCB) made of polyethylene terephthalate (PET), glass, polycarbonate (PC), silicon (Si), or the like, on which a plurality of light sources 110 is mounted, or may take the form of a film.

The circuit board 120 may be selected from among a single-layer PCB, a multi-layer PCB, a ceramic board, a metal core PCB and the like.

The light source 110 may be a Light Emitting Diode (LED) chip. The LED chip may be a blue LED chip or ultraviolet LED chip, or may be a package combining at least one or more selected from among a red LED chip, green LED chip, blue LED chip, yellow green LED chip and white LED chip.

A white LED may be realized by coupling a yellow phosphor to a blue LED, by coupling both red and green phosphors to a blue LED, or by coupling yellow, red and green phosphors to a blue LED.

The first reflector 200 and the second reflector 300 may be spaced apart from each other by a predetermined distance so as to face each other such that an air guide is defined in a gap between the first reflector 200 and the second reflector 300.

The first reflector 200 may be made of any one of a reflective coating film and a reflective coating material layer and may serve to reflect light emitted from the light source module 100 toward the second reflector 300.

A saw-toothed reflective pattern may be formed on a surface of the first reflector 200 facing the light source module 100. The reflective pattern may have a flat surface or a curved surface.

Providing the surface of the first reflector 200 with the reflective pattern is to reflect light emitted from the light source module 100 toward a central region of the second reflector 300, thereby increasing luminance of a central region of the backlight unit.

The second reflector 300 may be partially provided with an inclined surface and may be made of a metal or metal oxide having high reflectivity, such as aluminum (Al), silver (Ag), gold (Au), titanium dioxide ($TiO_2$) or the like.

The inclined surface of the second reflector 300 may overlap with at least one of the light source module 100 and the first and third reflectors 200 and 400.

The inclined surface of the second reflector 300 may have a predetermined gradient with respect to a surface of the first reflector 200. The inclined surface may be at least one of a concave surface, a convex surface and a flat surface.

As occasion demands, the second reflector 300 may include at least one inclined surface and at least one horizontal surface and the horizontal surface of the second reflector 300 may be parallel to the first reflector 200.

The second reflector 300 may include at least two inclined surfaces having at least one inflection point. The first and second inclined surfaces, which are adjacent to each other about an inflection point, may have different curvatures.

The third reflector 400 may be disposed between the light sources 110 of the light source module 100.

The third reflector 400 may be made of any one of a reflective coating film and a reflective coating material layer, and may serve to guide light emitted from the light source module 100 toward the central region of the second reflector 300.

Specifically, the third reflector 400 may serve to guide light, so as to compensate for the luminance of a region distant from the light source module 100.

In the embodiments, the third reflector 400 may be spaced apart from both the first reflector 200 and the second reflector 300 by predetermined distances, or may come into contact with both the first reflector 200 and the second reflector 300.

Alternatively, the third reflector 400 may come into contact with the first reflector 200 while being spaced apart from the second reflector 300 by a predetermined distance, or may come into contact with the second reflector 300 while being spaced apart from the first reflector 200 by a predetermined distance.

Figure 2A:
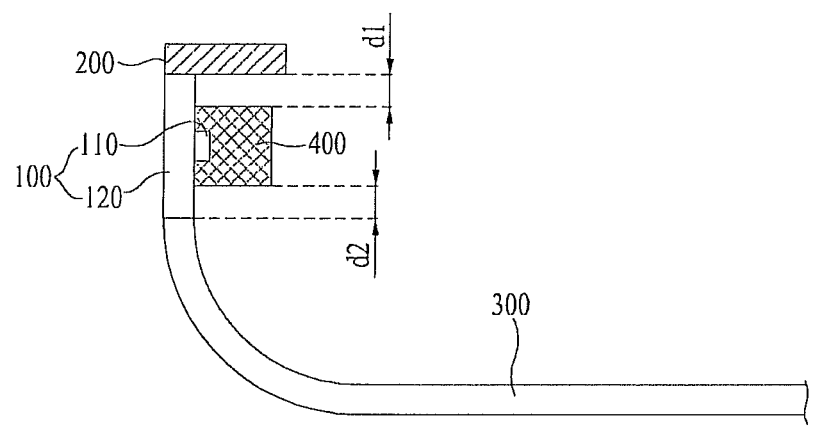
FIGS. 2A to 2C are views illustrating a distance relationship between a third reflector and a first or second reflector.
Figure 2B:
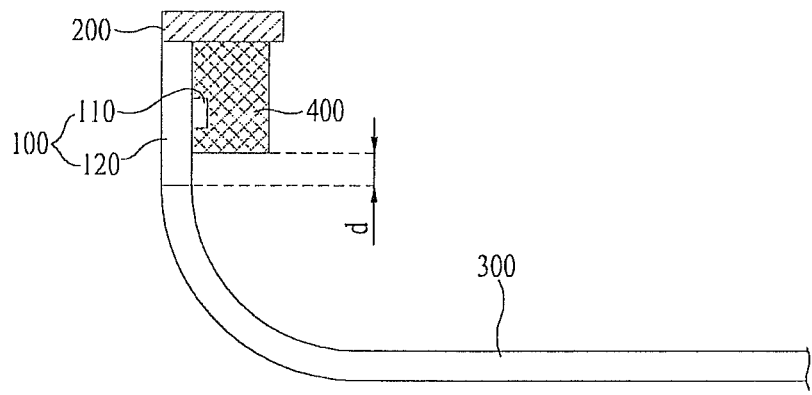
Figure 2C:
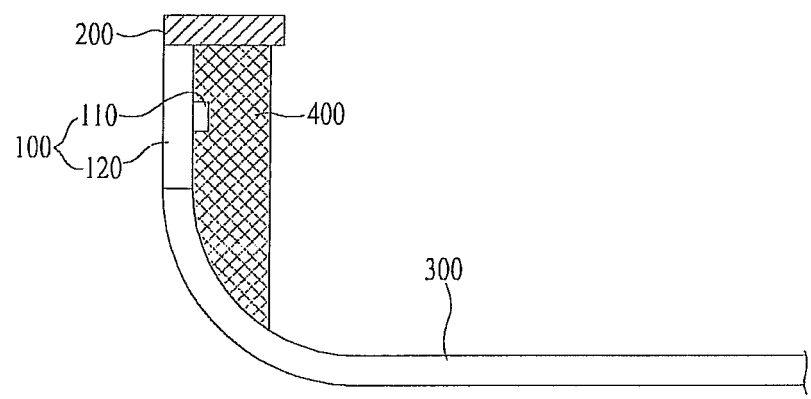

FIGS. 2A to 2C are views illustrating a distance relationship between the third reflector and the first or second reflector.

FIG. 2A is a view illustrating the third reflector 400 spaced apart from the first reflector 200 and the second reflector 300 by predetermined distances, FIG. 2B is a view illustrating the third reflector 400 spaced apart from the second reflector 300 by a predetermined distance while coming into contact with the first reflector 200, and FIG. 2C is a view illustrating the third reflector 400 coming into contact with both the first reflector 200 and the second reflector 300.

As illustrated in FIG. 2A, the third reflector 400 may protrude from the circuit board 120 of the light source module 100 and be located between the two light sources 110.

The third reflector 400 may be spaced apart from the first reflector 200 by a first distance d1 and be spaced apart from the second reflector 300 by a second distance d2.

Here, the first distance d1 and the second distance d2 may be equal to each other, or may be different.

In one example, the first distance d1 may be less than the second distance d2.

This is because the first distance d1 greater than the second distance d2 may cause hot spot phenomenon.

As illustrated in FIG. 2B, the third reflector 400 may come into contact with the first reflector 200 and be spaced apart from the second reflector 300 by a distance d.

Here, the third reflector 400, which comes into contact with the first reflector 200, can prevent hot spot phenomenon and can reflect light to a region distant from the light source module 100.

As illustrated in FIG. 2C, the third reflector 400 may come into contact with the first reflector 200 and the second reflector 300.

The third reflector 400 comes into contact at a lower surface thereof with the second reflector 300, and the lower surface of the third reflector 400 may have the same inclined surface as that of the second reflector 300.

As described above, the third reflector 400 may protrude from the circuit board 120 of the light source module 100 by a predetermined length.

Specifically, as illustrated in FIGS. 2A to 2C, the length of the third reflector 400 may be determined in such a manner that the third reflector 400 overlaps with the first reflector 200, but is shorter than the first reflector 200.

As occasion demands, the length of the third reflector 400 may be equal to or greater than the length of the first reflector 200.

Figure 3A:
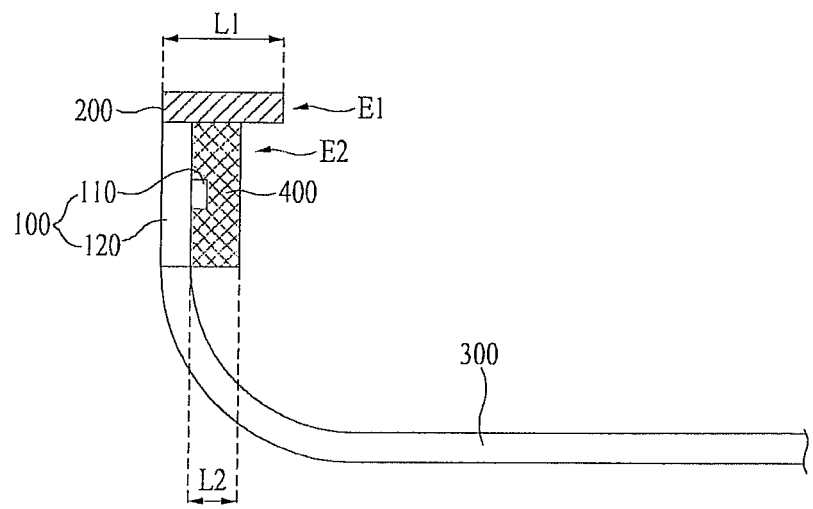
FIGS. 3A to 3C are views comparing the length of a third reflector spaced apart from a second reflector with the length of a first reflector.
Figure 3B:
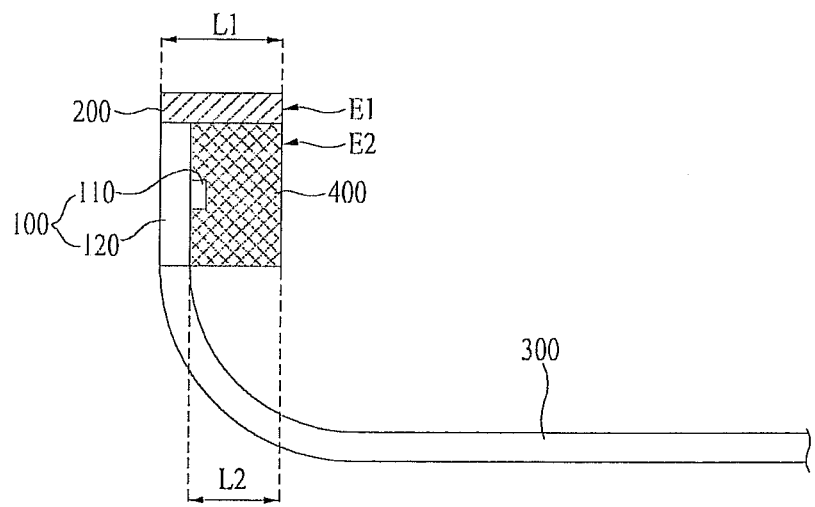
Figure 3C:
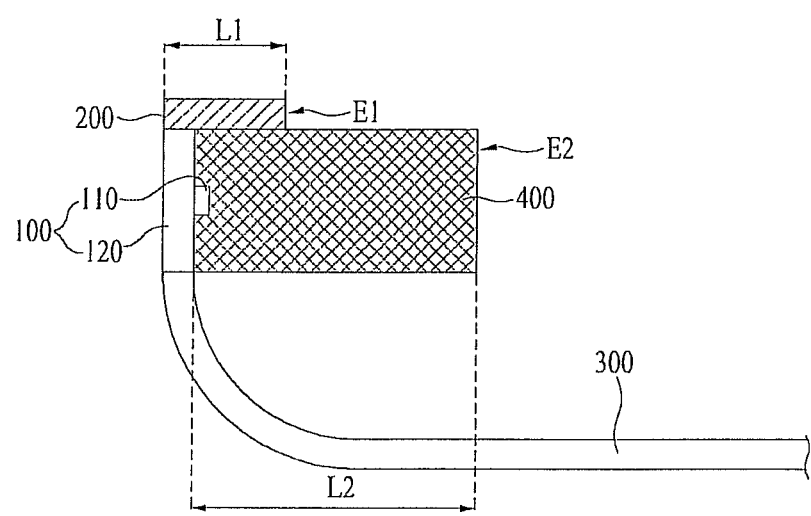

FIGS. 3A to 3C are views comparing the length of the third reflector spaced apart from the second reflector with the length of the first reflector.

More particularly, FIGS. 3A, 3B and 3C are views illustrating different overlap lengths of the third reflector 400 with respect to the first reflector 200.

As illustrated in FIG. 3A, the third reflector 400 may protrude from the circuit board 120 of the light source module 100 and be located between the two light sources 110.

More specifically, the third reflector 400 may protrude from the circuit board 120 of the light source module 100 by a length L2 so as to overlap with the first reflector 200.

Here, the length L2 of the third reflector 400 may be less than a length L1 of the first reflector 200.

Thus, an edge portion E2 of the third reflector 400 may be inwardly spaced apart from an edge portion E1 of the first reflector 200 by a predetermined distance so as to be located within the range of a lower surface of the first reflector 200.

As illustrated in FIG. 3B, the third reflector 400 may protrude from the circuit board 120 of the light source module 100 by a length L2 so as to overlap with the first reflector 200.

Here, the length L2 of the third reflector 400 may be less than a length L1 of the first reflector 200 and the edge portion E2 of the third reflector 400 and the edge portion E1 of the first reflector 200 may be in line with each other.

As illustrated in FIG. 3C, the third reflector 400 may protrude from the circuit board 120 of the light source module 100 by a length L2 so as to partially overlap with the first reflector 200.

Here, the length L2 of the third reflector 400 may be equal to or greater than a length L1 of the first reflector 200.

Thus, the edge portion E1 of the first reflector 200 may be inwardly spaced apart from the edge portion E2 of the third reflector 400 by a predetermined distance.

As described above, the third reflector 400 spaced apart from the second reflector 300 may have various lengths.

In the embodiments, the third reflector 400 may come into contact with the second reflector 300. The third reflector 400 coming into contact with the second reflector 300 may have various lengths.

Figure 4A:
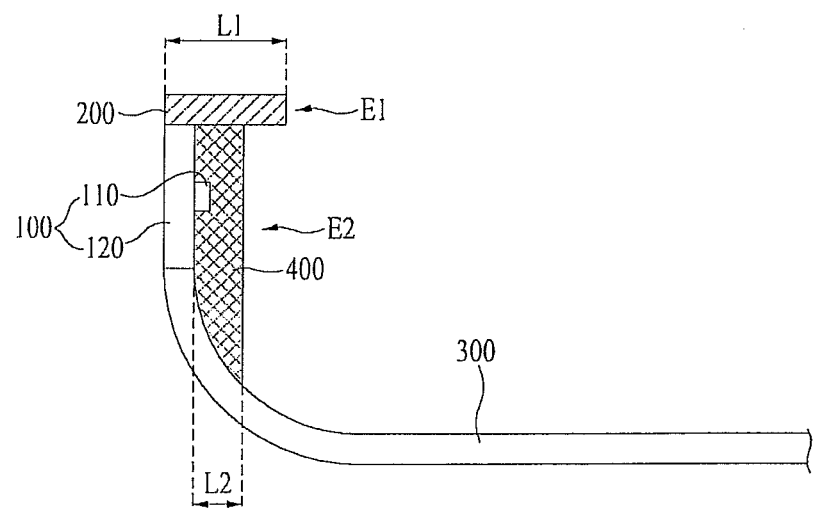
FIGS. 4A to 4C are views comparing the length of a third reflector coming into contact with a second reflector with the length of a first reflector.
Figure 4B:
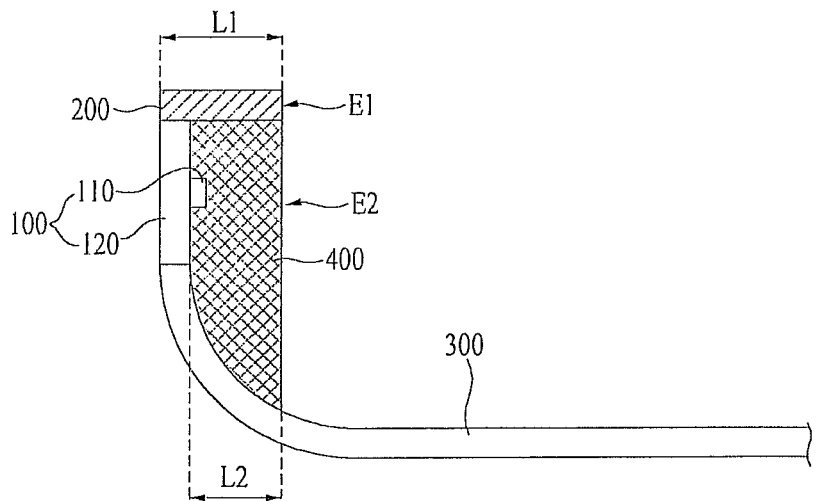
Figure 4C:
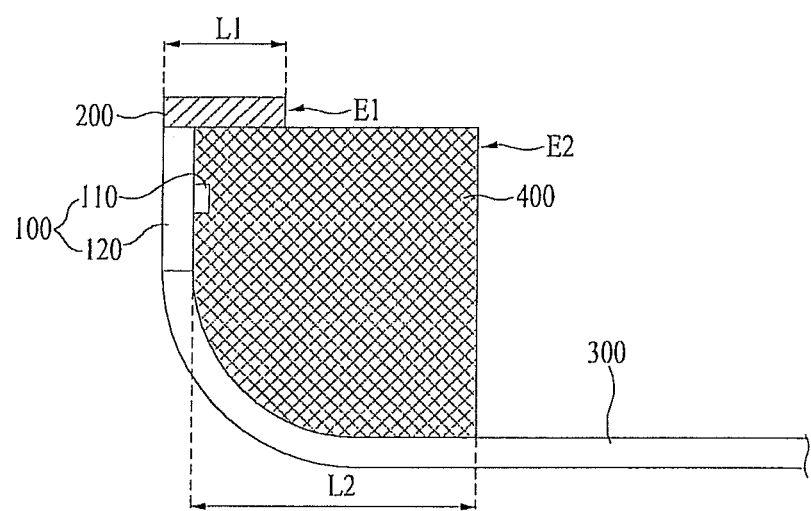

FIGS. 4A to 4C are views comparing the length of the third reflector coming into contact with the second reflector with the length of the first reflector.

As illustrated in FIG. 4A, the third reflector 400 may come into contact with the second reflector 300 and may protrude from the circuit board 120 of the light source module 100 by a length L2 so as to overlap with the first reflector 200.

Here, the length L2 of the third reflector 400 may be less than a length L1 of the first reflector 200.

Thus, the edge portion E2 of the third reflector 400 may be inwardly spaced apart from the edge portion E1 of the first reflector 200 by a predetermined distance so as to be located within the range of the lower surface of the first reflector 200.

As illustrated in FIG. 4B, the third reflector 400 may protrude from the circuit board 120 of the light source module 100 by a length L2 so as to overlap with the first reflector 200.

The length L2 of the third reflector 400 may be less than a length L1 of the first reflector 200, and the edge portion E2 of the third reflector 400 and the edge portion E1 of the first reflector 200 may be in line with each other.

As illustrated in FIG. 4C, the third reflector 400 may protrude from the circuit board 120 of the light source module 100 by a length L2 so as to partially overlap with the first reflector 200.

The length L2 of the third reflector 400 may be equal to or greater than a length L1 of the first reflector 200.

Thus, the edge portion E1 of the first reflector 200 may be inwardly spaced apart from the edge portion E2 of the third reflector 400 by a predetermined distance so as to be located within the range of an upper surface of the third reflector 400.

To allow the third reflector 400 to come into contact with the second reflector 300 as described above, a lower surface of the third reflector 400 may have the same shape as an upper surface of the second reflector 300.

In the embodiments, one or a plurality of light sources may be disposed between adjacent third reflectors 400.

Figure 5A:
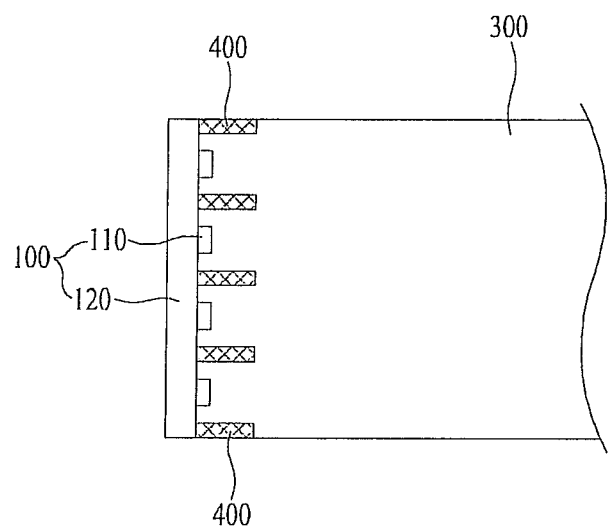
FIGS. 5A to 5C are views illustrating a light source disposed between third reflectors.
Figure 5B:
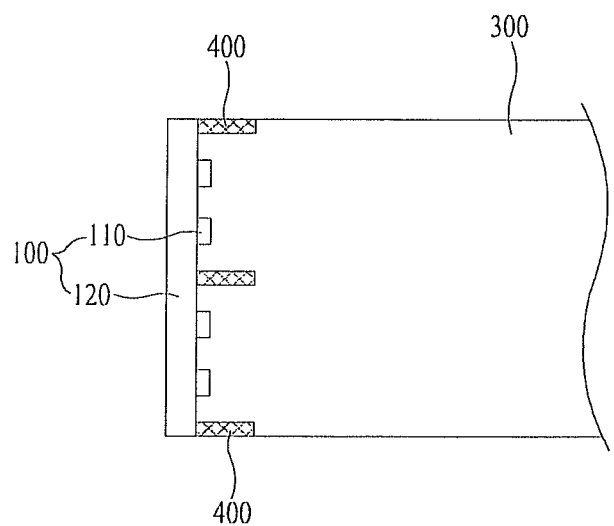
Figure 5C:
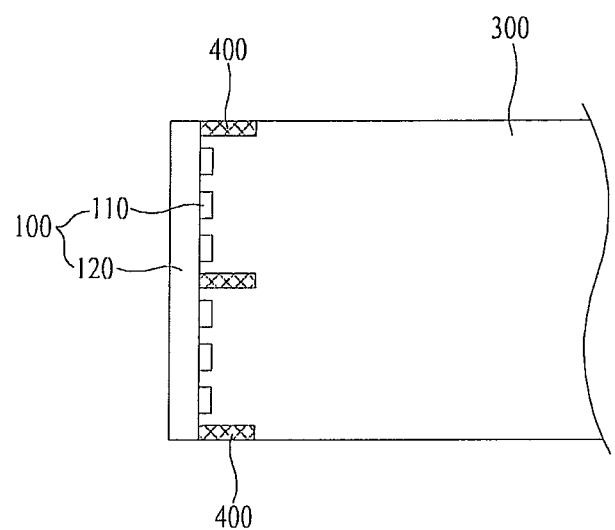

FIGS. 5A to 5C are views illustrating a light source disposed between two third reflectors.

FIG. 5A is a view illustrating a state in which a single light source 110 is disposed between adjacent third reflectors 400, FIG. 5B is a view illustrating a state in which two light sources 110 are disposed between adjacent third reflectors 400, and FIG. 5C is a view illustrating a state in which three light sources 110 are disposed between adjacent third reflectors 400.

As illustrated in FIGS. 5A to 5C, the third reflector 400 may protrude from the circuit board 120 of the light source module 100 and be located between two light sources 110.

A single light source 110 may be disposed between adjacent third reflectors 400 as illustrated in FIG. 5A, or a plurality of light sources 110 may be disposed between adjacent third reflectors 400 as illustrated in FIGS. 5B and 5C.

As occasion demands, the number of light sources 110 disposed between adjacent third reflectors 400 may vary.

For example, a single light source 110 may be disposed between one pair of third reflectors 400, and two light sources 110 may be disposed between another pair of third reflectors 400.

As described above, the number of light sources 110 disposed between any one pair of third reflectors 400 may be different from the number of light sources 110 disposed between another pair of third reflectors 400.

In addition, one or a plurality of light source modules 100 may be disposed between adjacent third reflectors 400.

In the embodiments, the third reflector 400 may be secured to the circuit board 120 of the light source module 100, but may be secured to an external support frame.

Figure 6A:
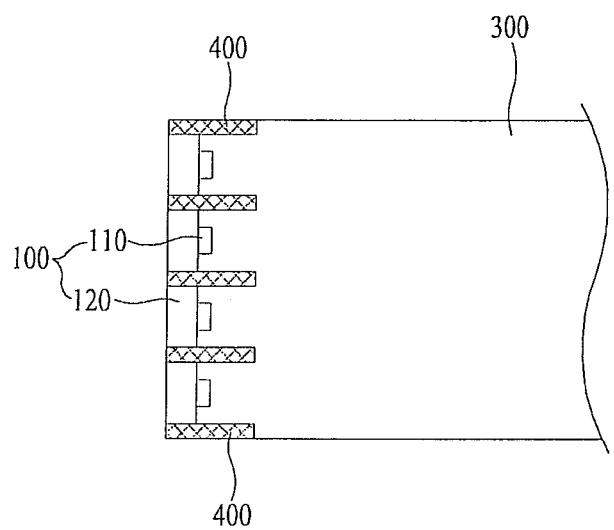
FIGS. 6A to 6C are views illustrating a light source module disposed between third reflectors.
Figure 6B:
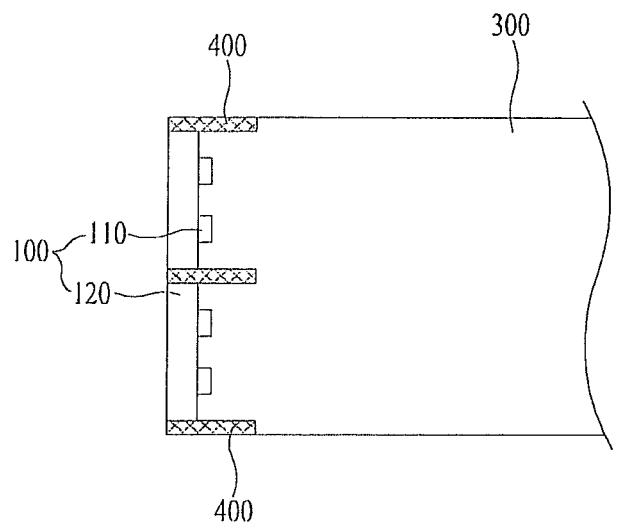
Figure 6C:
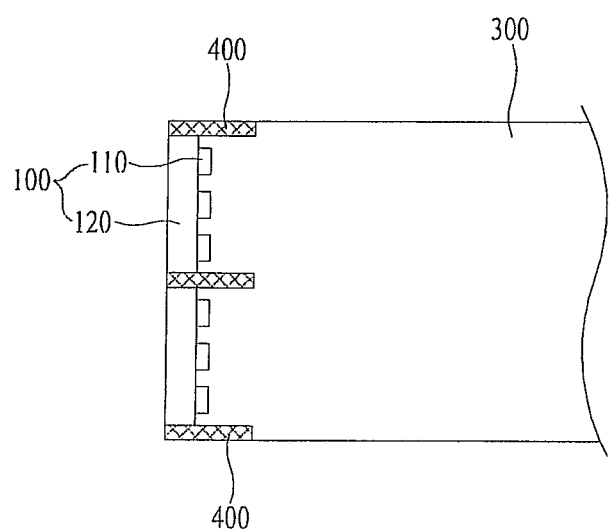

FIGS. 6A to 6C are views illustrating a light source module disposed between third reflectors.

FIG. 6A is a view illustrating a state in which a single light source module 100 having a single light source 110 is disposed between adjacent third reflectors 400, FIG. 6B is a view illustrating a state in which a light source module 100 having two light sources 110 is disposed between adjacent third reflectors 400, and FIG. 6C is a view illustrating a state in which a light source module 100 having three light sources 110 is disposed between adjacent third reflectors 400.

As illustrated in FIGS. 6A to 6C, the third reflector 400 may be secured to an external support frame (not shown) so as to protrude from the external support frame and be located between two light source modules 100.

A light source module 100 having a single light source 110 may be disposed between adjacent third reflectors 400 as illustrated in FIG. 6A, or a light source module 100 having a plurality of light sources 110 may be disposed between adjacent third reflectors 400 as illustrated in FIGS. 6B and 6C.

As occasion demands, the number of light sources 110 of the light source module 100 disposed between adjacent third reflectors 400 may vary.

For example, the light source module 100 having one light source 110 may be disposed between one pair of third reflectors 400, and the light source module 100 having two light sources 110 may be disposed between another pair of third reflectors 400.

As described above, the third reflector 400 may be secured to the external support frame and the light source module 100 may be disposed between adjacent third reflectors 400.

Also, the number of light sources 110 of the light source module 100 disposed between any one pair of third reflectors 400 may be different from the number of light sources 110 of the light source module 100 disposed between another pair of third reflectors 400.

In the embodiments, when the third reflector 400 is secured to the circuit board 120 of the light source module 100, the third reflector 400 may be spaced apart from the light source 110 by a predetermined source, or may come into contact with the light source 110.

Figure 7A:
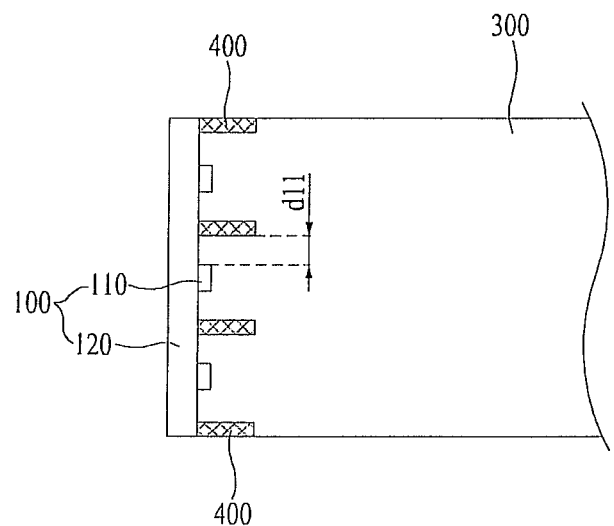
FIGS. 7A and 7B are views illustrating a distance relationship between a third reflector and a light source.
Figure 7B:
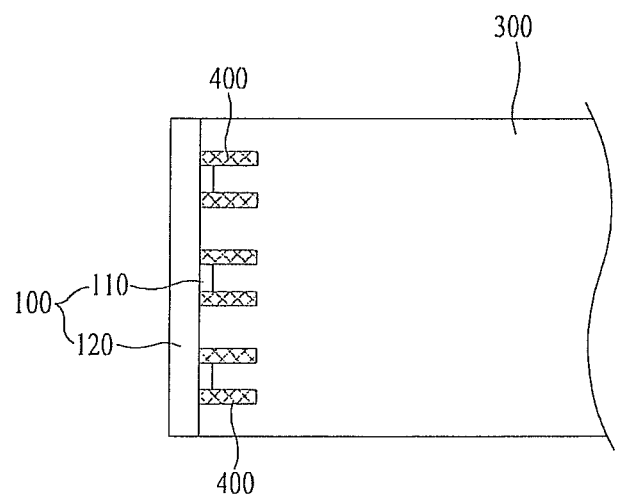

FIGS. 7A and 7B are views illustrating a distance relationship between the third reflector and the light source.

FIG. 7A is a view illustrating a state in which the third reflector 400 is spaced apart from the light source 110 by a distance d11, and FIG. 7B is a view illustrating a state in which the third reflector 400 comes into contact with the light source 110.

As illustrated in FIG. 7A, the third reflector 400 may be secured to the circuit board 120 of the light source module 100 and the light source 110 of the light source module 100 may be disposed between adjacent third reflectors 400.

The third reflector 400 may be spaced apart from the light source 110 by the predetermined distance dli.

As illustrated in FIG. 7B, the third reflector 400 may be disposed close to the light source 110, or may come into contact with the light source 110.

One or a plurality of third reflectors 400 may be disposed between adjacent light sources 110.

Adjusting a distance between the third reflector 400 and the light source 110 serves to increase straightness of light emitted from the light source 110 with decreasing distance between the third reflector 400 and the light source 110.

Thus, by appropriately adjusting the distance between the third reflector 400 and the light source 100 according to design of the backlight unit, the backlight unit may achieve uniform luminance.

In the embodiments, the third reflector 400 may be processed such that a lateral surface thereof facing the light source 110 has various shapes, in order to reflect light to a region distant from the light source module 100.

FIGS. 8A to 8E are views illustrating third reflectors having various shapes of lateral surfaces.

Figure 8A:
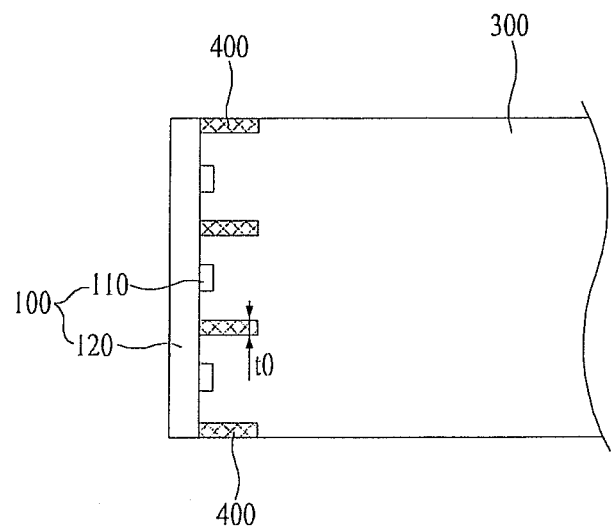
FIGS. 8A to 8E are views illustrating third reflectors having various shapes of lateral surfaces.

FIG. 8A is a view illustrating a third reflector in which a portion thereof close to the light source 110 and a portion thereof distant from the light source 110 have the same thickness. FIGS. 8B to 8E are views illustrating a third reflector in which a portion thereof close to the light source 110 and a portion thereof distant from the light source 110 have different thicknesses.

As illustrated in FIG. 8A, lateral surfaces of adjacent third reflectors 400 may face each other in parallel.

A portion of each third reflector 400 close to the light source 110 may have the same thickness t0 as a portion of the third reflector 400 distant from the light source 110.

Figure 8B:
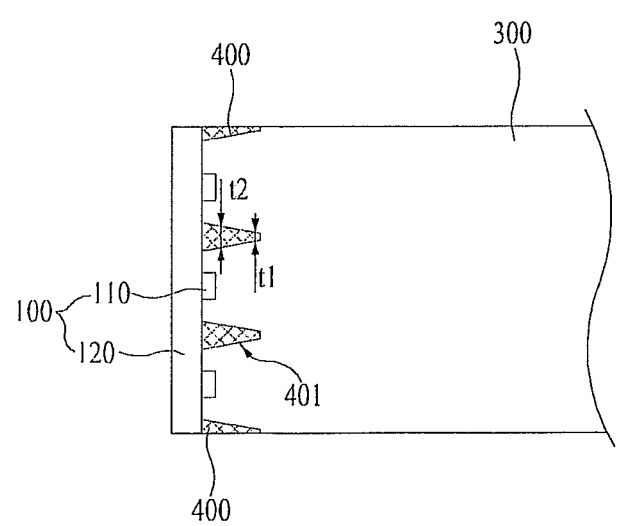

As illustrated in FIG. 8B, lateral surfaces 401 of adjacent third reflectors 400 may face each other without being parallel to each other.

The lateral surface 401 of each third reflector 400 may be a flat inclined surface.

In the third reflector 400, a thickness t2 of a portion thereof close to the light source 110 may be greater than a thickness t1 of a portion thereof distant from the light source 110.

Figure 8C:
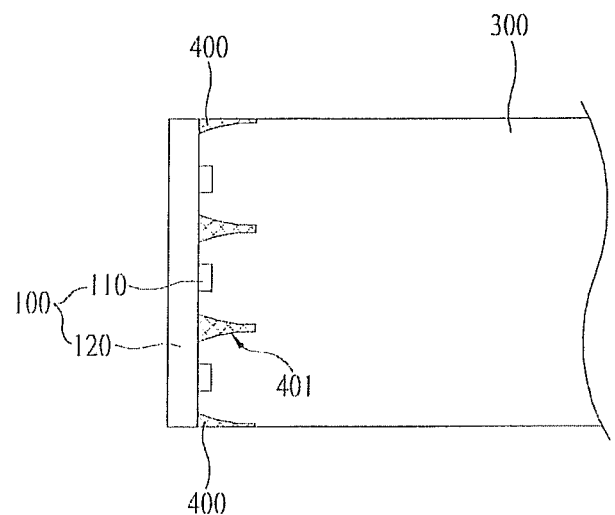

As illustrated in FIG. 8C, lateral surfaces 401 of adjacent third reflectors 400 may face each other without being parallel to each other.

The lateral surface 401 of each third reflector 400 may be a concavely inclined surface.

The thickness of the third reflector 400 may gradually decrease from a portion thereof close to the light source 110 to a portion thereof distant from the light source 110.

Figure 8D:
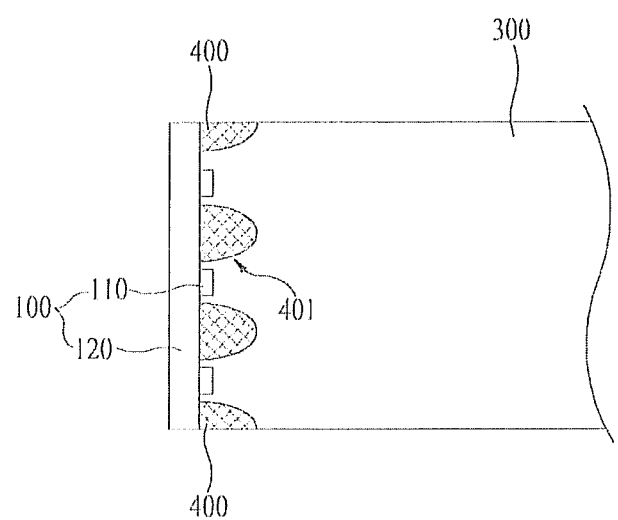

As illustrated in FIG. 8D, lateral surfaces 401 of adjacent third reflectors 400 may face each other without being parallel to each other.

The lateral surface 401 of each third reflector 400 may be a convexly inclined surface.

The thickness of the third reflector 400 may gradually decrease from a portion thereof close to the light source 110 to a portion thereof distant from the light source 110.

Figure 8E:
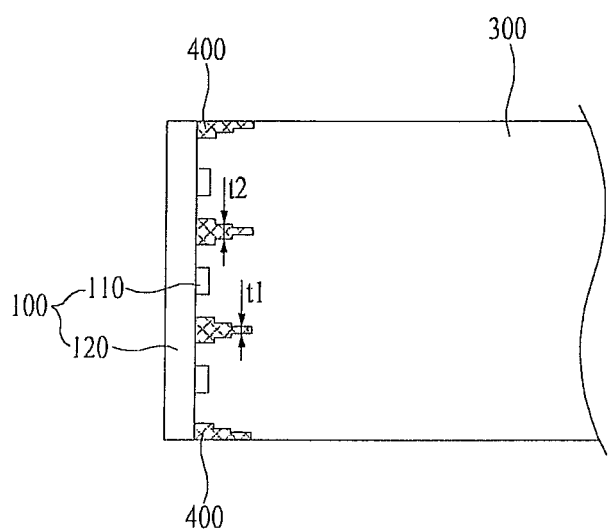

As illustrated in FIG. 8E, lateral surfaces 401 of adjacent third reflectors 400 may face each other without being parallel to each other.

The lateral surface 401 of each third reflector 400 may be a stepped surface.

The thickness t2 of a portion of the third reflector 400 close to the light source 110 may be greater than the thickness t1 of a portion of the third reflector 400 distant from the light source 110.

In the embodiments, a plurality of third reflectors 400 may have the same length, or some of the third reflectors 400 may have different lengths.

Figure 9A:
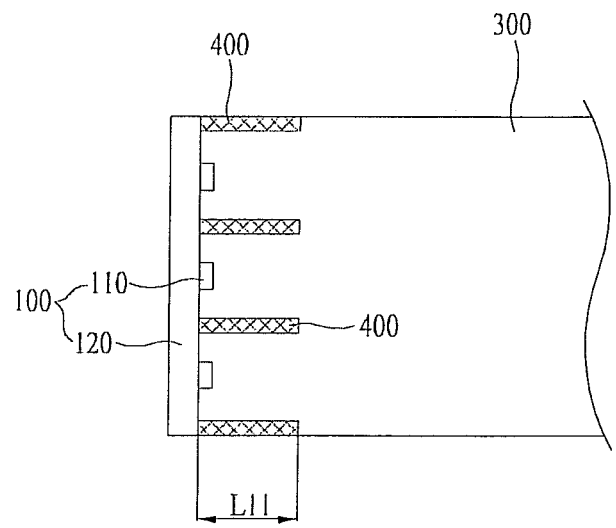
FIGS. 9A to 9C are views illustrating third reflectors having various lengths.
Figure 9B:
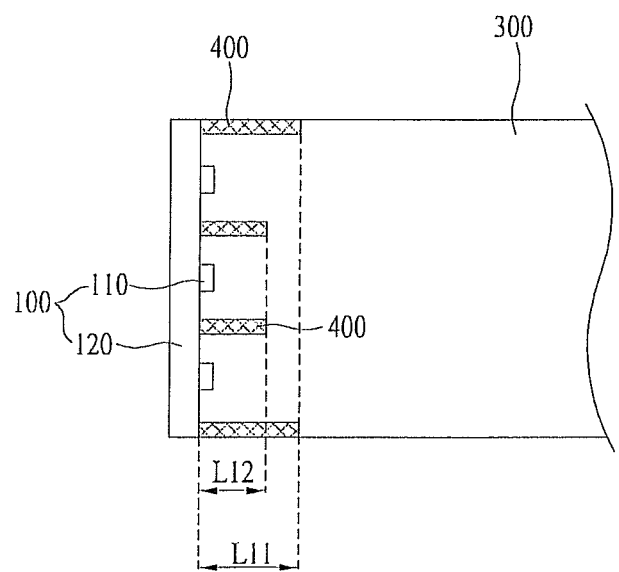
Figure 9C:
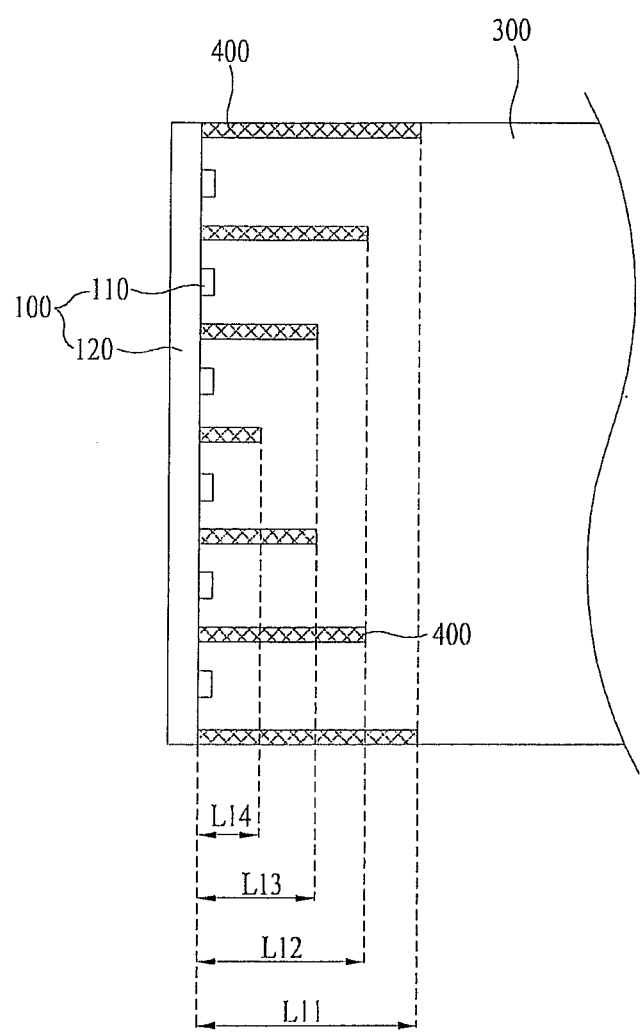

FIGS. 9A to 9C are views illustrating third reflectors having various lengths.

FIG. 9A is a view illustrating the case in which one third reflector 400 located at the edge of the light source module 100 and another third reflector 400 located at the center of the light source module 100 have the same length, FIG. 9B is a view illustrating the case in which one third reflector 400 located at the edge of the light source module 100 and another third reflector 400 located at the center of the light source module 100 have different lengths, and FIG. 9C is a view illustrating the case in which the lengths of the third reflectors 400 disposed on the light source module 100 decrease from the edge to the center of the light source module 100.

As illustrated in FIG. 9A, the plurality of third reflectors 400 may be secured to the circuit board 120 of the light source module 100 so as to protrude by a length L11.

Here, all the third reflectors 400 may have the same length.

More specifically, one third reflector 400 located at the edge of the light source module 100 and another third reflector 400 located at the center of the light source module 100 may have the same length.

As illustrated in FIG. 9B, one third reflector 400 located at the edge of the light source module 100 may protrude from the circuit board 120 by a length L11 and another third reflector 400 located at the center of the light source module 100 may protrude from the circuit board 120 by a length L12.

The length L11 of the third reflector 400 located at the edge of the light source module 100 may be greater than the length L12 of the third reflector 400 located at the center of the light source module 100.

This serves to reduce loss of light at the edge of the backlight unit and to concentrate light on the center of the backlight unit to enable compensation for low luminance, thereby providing uniform luminance throughout the backlight unit.

As illustrated in FIG. 9C, one third reflector 400 located at the edge of the light source module 100 may protrude from the circuit board 120 by a length L11, another third reflector 400 located at the center of the light source module 100 may protrude from the circuit board 120 by a length L14, and other third reflectors 400 located between the edge and the center of the light source module 100 may respectively protrude from the circuit board 120 by lengths L12 and L13.

As can be appreciated, the lengths of the third reflectors 400 may gradually decrease from the edge of the light source module 100 to the center of the light source module 100.

This serves to reduce loss of light at the edge of the backlight unit and to concentrate light on the center of the backlight unit to enable compensation for low luminance, thereby providing uniform luminance throughout the backlight unit.

In the embodiments, the third reflector 400 may have various reflective patterns on the lateral surface thereof.

FIGS. 10A to 10D are views illustrating third reflectors having various reflective patterns.

Figure 10A:
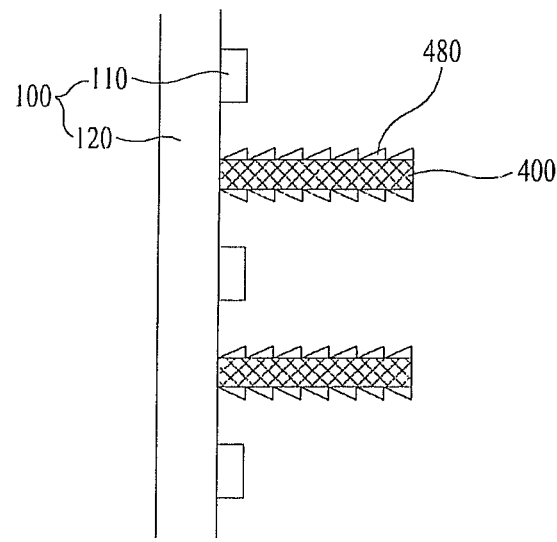
FIGS. 10A to 10D are views illustrating third reflectors having various reflective patterns.
Figure 10B:
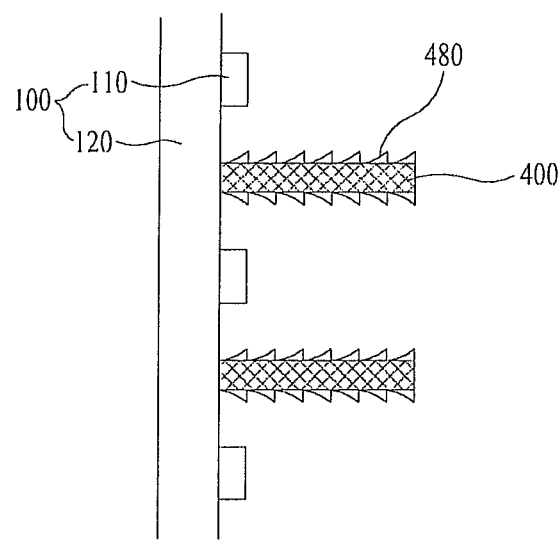
Figure 10C:
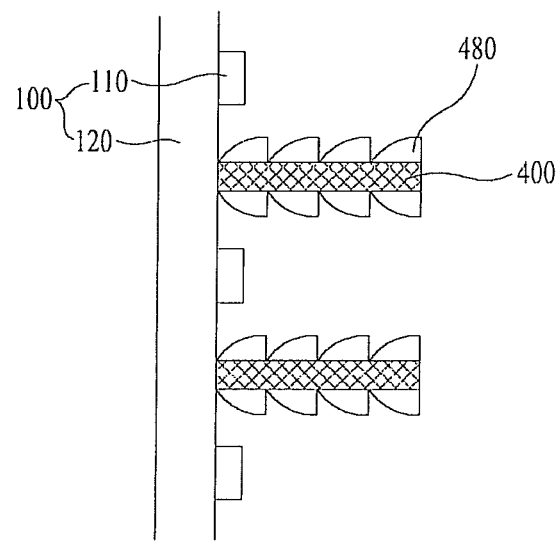

FIG. 10A illustrates one toothed reflective pattern 480, teeth of which have a flat surface, and FIGS. 10B and 10C illustrate another toothed reflective pattern 480, teeth of which have a curved surface.

The teeth of the reflective pattern 480 may have a concavely curved surface as illustrated in FIG. 10B, or may have a convexly curved surface as illustrated in FIG. 10C.

Figure 10D:
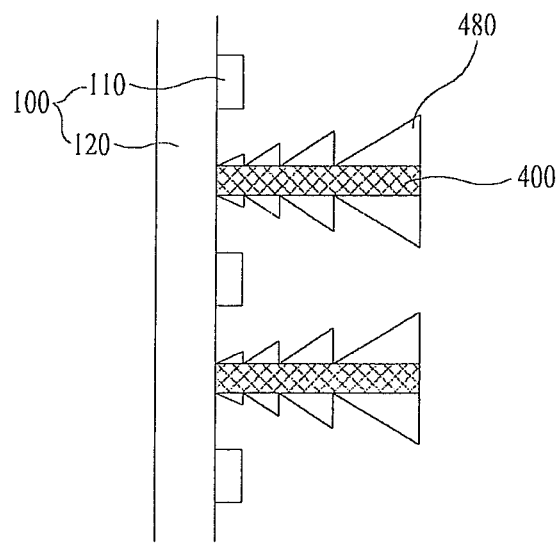

As occasion demands, as illustrated in FIG. 10D, the teeth of the reflective pattern 480 may gradually increase in size from one end to the other end of the third reflector 400.

Forming the reflective pattern 480 on the third reflector 400 may provide effective light diffusion as well as reflection.

Thus, the size of the reflective pattern 480 may vary on a per region basis according to the luminance distribution of the backlight unit.

In the embodiments, the third reflector 400 may be formed in such a manner that a body thereof is formed using an injection molding material, a mirror surface is processed thereon, and a reflective layer or reflective sheet is formed on the body.

Figure 11:
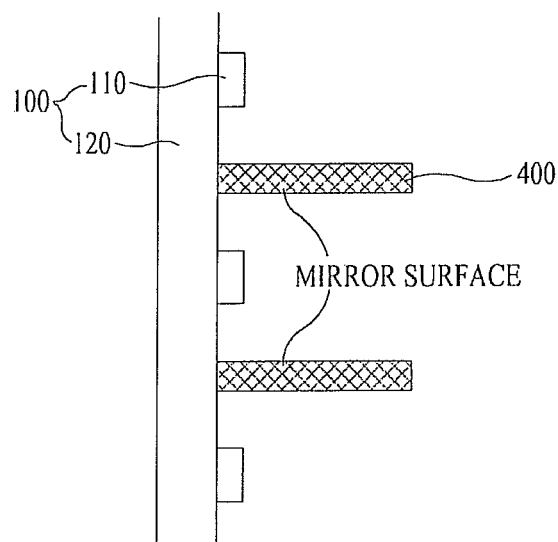
FIG. 11 is a view illustrating a third reflector having a mirror surface.

FIG. 11 is a view illustrating a third reflector having a mirror surface.

As illustrated in FIG. 11, the third reflector 400 may have a mirror surface facing the light source 110.

A body of the third reflector 400 may be made of a polymer resin suitable for injection molding, or may be made of a metal or metal oxide.

The mirror surface of the third reflector 400 may be processed by grinding or the like, and may have reflectivity of about 60~99%.

FIGS. 12A to 12D are views illustrating a third reflector having a reflective member.

Figure 12A:
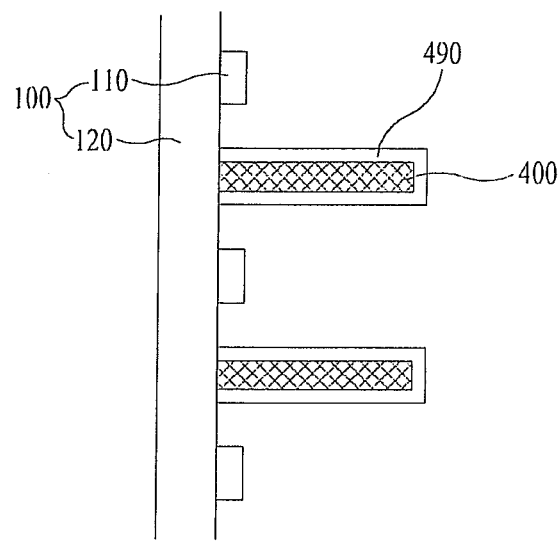
FIGS. 12A to 12D are views illustrating a third reflector having a reflective member.
Figure 12B:
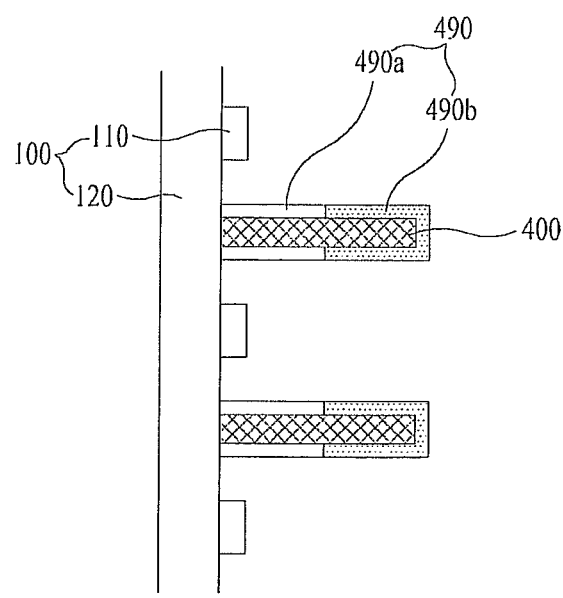

FIGS. 12A and 12B are views illustrating the case in which a reflective member 490 is formed over the entire surface of the third reflector 400. FIG. 12A illustrates the reflective member, the reflectivity of which is constant, whereas FIG. 12B illustrates the reflective member, the reflectivity of which varies.

As illustrated in FIGS. 12A and 12B, the reflective member 490 may take the form of a film or sheet attached to the body of the third reflector 400. For example, the reflective member 490 may be formed by depositing or coating a reflective material on the body of the third reflector 400, or by printing reflective ink.

Here, deposition may be performed by thermal deposition, evaporation, or vacuum deposition such as sputtering, and coating or printing may be performed by gravure coating, silk screen printing, or the like.

The reflective member 490 may contain at least one of a metal and metal oxide having high reflectivity, such as aluminum (Al), silver (Ag), gold (Au) or titanium dioxide ($TiO_2$).

In FIG. 12A, the third reflector 400 may have a single reflective member 490 to provide the entire third reflector 400 with constant reflectivity. In FIG. 12B, the third reflector 400 may have first and second reflective members 490a and 490b having different reflectivities such that different portions of the third reflector 400 have different reflectivities.

In FIG. 12B, the first reflective member 490a closer to the light source 110 may have greater reflectivity than the second reflective member 490b.

This serves to reflect light emitted from the light source 110 to a region more distant from the light source 110.

Figure 12C:
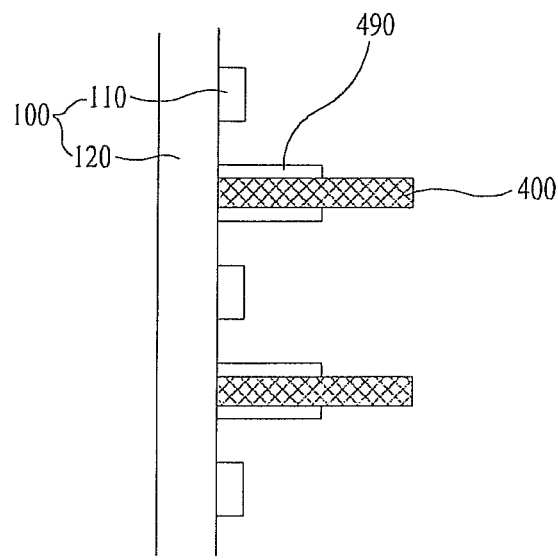
Figure 12D:
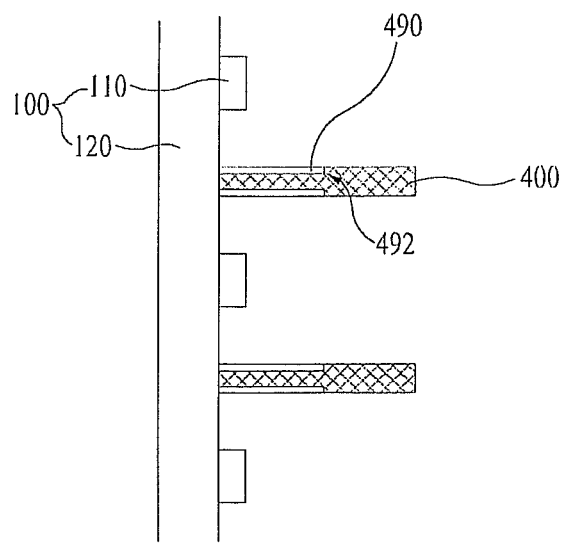

FIGS. 12C and 12D are views illustrating the case in which the reflective member 490 is formed on a partial surface of the third reflector 400. Also, FIG. 12C illustrates the reflective member formed on the surface of the third reflector 400, whereas FIG. 12D illustrates the reflective member formed in a groove of the third reflector 400.

As illustrated in FIGS. 12C and 12D, the reflective member 490 may be formed only on a portion of the third reflector 400.

In FIG. 12C, the reflective member 490 may protrude from a partial surface of the third reflector 400. In FIG. 12D, a groove is indented in the partial surface of the third reflector 400 such that the reflective member 490 is filled in the groove.

In the embodiments, the third reflector 400 may include a specular-reflection area and a diffuse-reflection area.

Figure 13A:
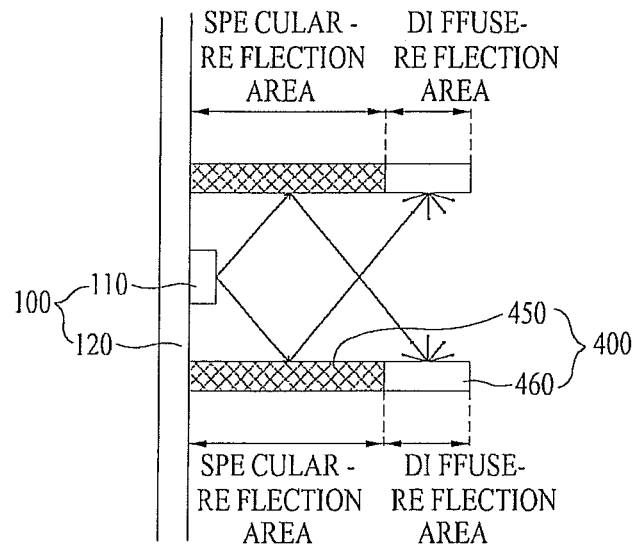
FIGS. 13A and 13B are views illustrating a third reflector having a specular-reflection area and a diffuse-reflection area.
Figure 13B:
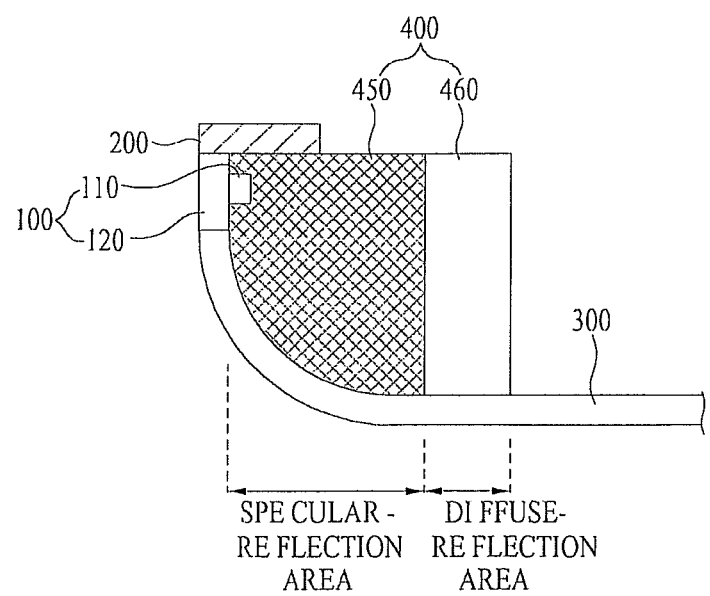

FIGS. 13A and 13B are views illustrating a third reflector having a specular-reflection area and a diffuse-reflection area, FIG. 13A being a plan view and FIG. 13B being a sectional view.

As illustrated in FIGS. 13A and 13B, the third reflector 400 may include a specular-reflection area 450 and a diffuse-reflection area 460.

The specular-reflection area 450 may serve to reflect incident light in a given direction, and the diffuse-reflection area 460 may serve to reflect incident light in several directions.

In this case, the specular-reflection area 450 may be disposed close to the light source 110 and the diffuse-reflection area 460 may be disposed more distant from the light source 110.

Thus, the specular-reflection area 450 of the third reflector 400 may reflect light emitted from the light source 100 to a region more distant from the light source 110, and the diffuse-reflection area 460 of the third reflector 400 may diffuse light to provide uniform luminance.

The specular-reflection area 450 and the diffuse-reflection area of the third reflector 400 may be formed by grinding the surface of the third reflector 400, or by providing the reflective member.

In the embodiments, the third reflector 400 may include a transmitting area and a non-transmitting area.

Figure 14A:
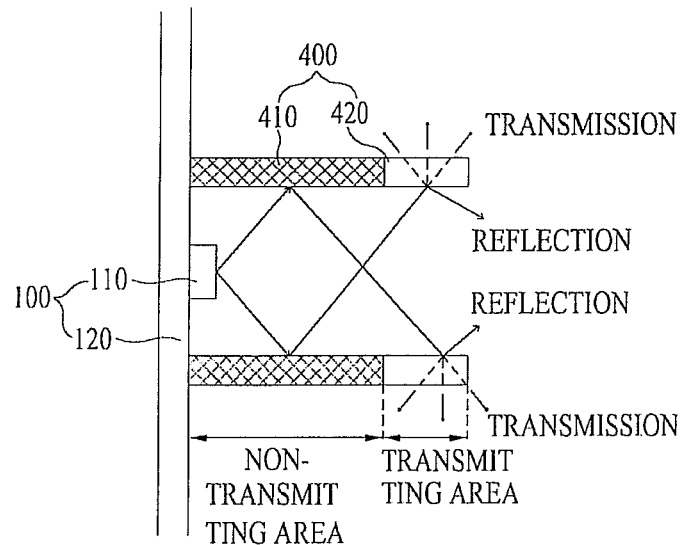
FIGS. 14A and 14B are views illustrating a third reflector including a transmitting area and a non-transmitting area.
Figure 14B:
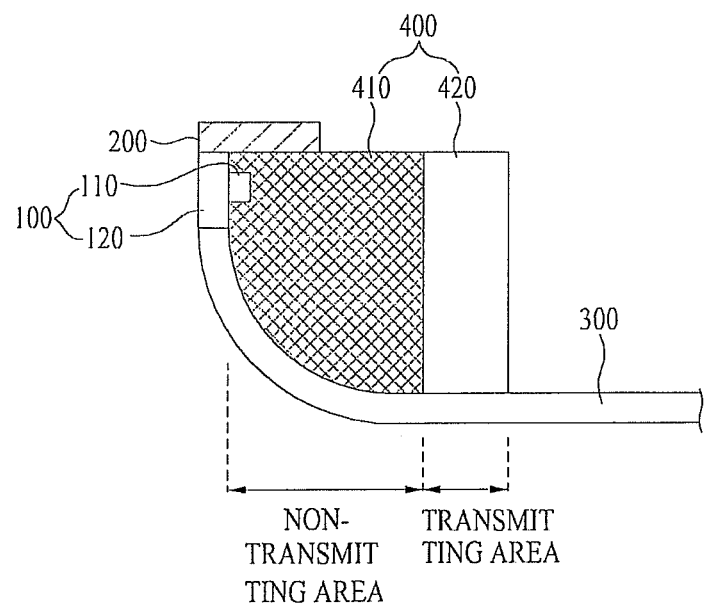

FIGS. 14A and 14B are views illustrating a third reflector including a transmitting area and a non-transmitting area. FIG. 14A is a plan view and FIG. 14B is a sectional view.

As illustrated in FIGS. 14A and 14B, the third reflector 400 may include a non-transmitting area 410 and a transmitting area 420.

The non-transmitting area 410 may serve to reflect incident light, and the transmitting area 420 may serve to reflect a portion of incident light and transmit and refract a portion of incident light.

The non-transmitting area 410 may be disposed close to the light source 110 and the transmitting area 420 may be disposed distant from the light source 110.

Thus, the non-transmitting area 410 of the third reflector 400 may reflect light emitted from the light source 100 to a region more distant from the light source 110 and the transmitting area 420 of the third reflector 400 may selectively reflect or transmit and refract incident light to provide uniform luminance.

The non-transmitting area 410 and the transmitting area 420 of the third reflector 400 may be made of an opaque material or transparent material, and may be formed by attaching an opaque reflective member to a transparent body.

In the embodiments, the third reflector may be configured to have various shapes.

Figure 15:
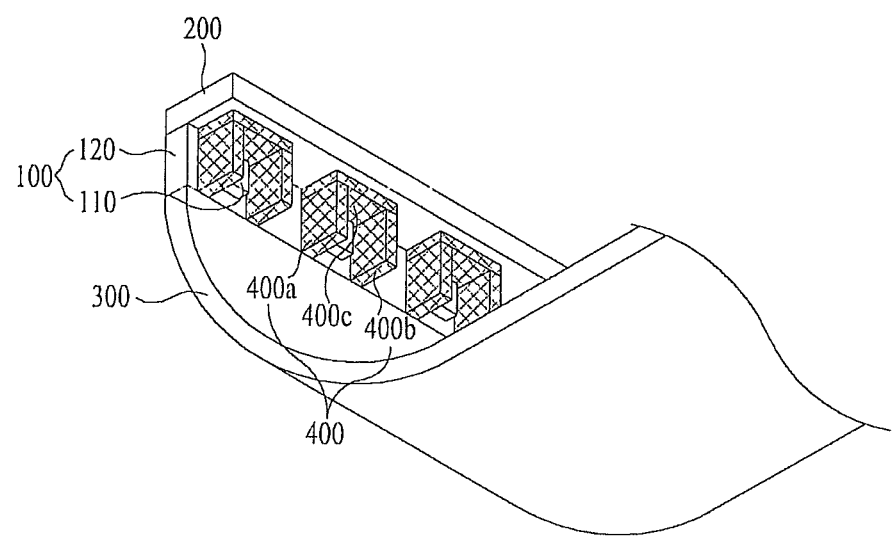
FIG. 15 is a view illustrating a third reflector having an open shape.
Figure 16:
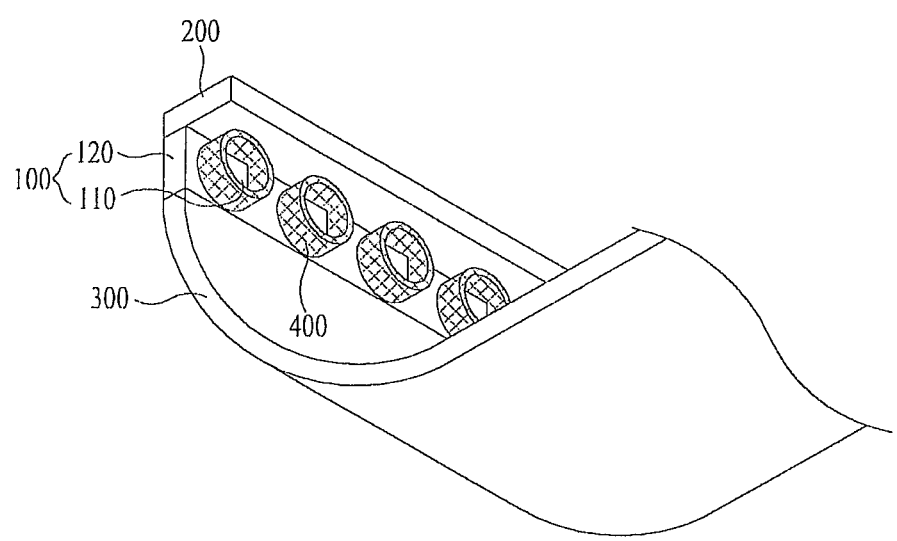
FIG. 16 is a view illustrating a third reflector having a closed shape.

FIG. 15 is a view illustrating a third reflector having an open shape, and FIG. 16 is a view illustrating a third reflector having a closed shape.

As illustrated in FIG. 15, the third reflector 400 may be configured to surround the light source 110 of the light source module 100 and a portion of the third reflector 400 facing the second reflector 300 may have an open shape.

The third reflector 400 may consist of first, second and third segments 400a, 400b and 400c.

The first and second segments 400a and 400b may be disposed at opposite sides of the light source 110, and the third segment 400c may be connected to the first and second segments 400a and 400b and be disposed between the first reflector 200 and the light source 110.

In this case, the third segment 400c may partially come into contact with the first reflector 200.

As illustrated in FIG. 16, the third reflector 400 may have a closed circular or polygonal shape to surround the light source 110 of the light source module 100.

In the embodiments, the second reflector 300 may include at least one inclined surface and at least one horizontal surface.

The inclined surface of the second reflector 300 may have a predetermined gradient with respect to the first reflector 200 and the horizontal surface of the second reflector 300 may be parallel to the first reflector 200.

The inclined surface of the second reflector 300 may overlap with at least one of the light source 110 and the first reflector 200.

Figure 17A:
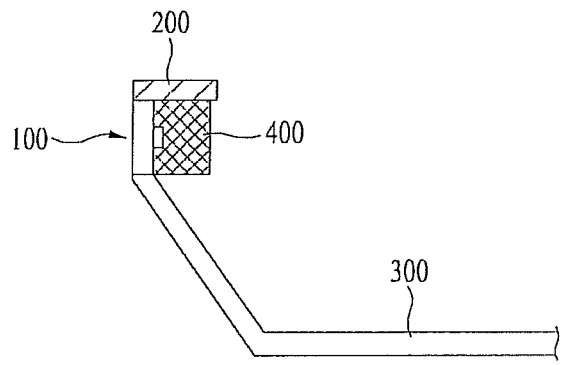
FIGS. 17A to 17C are views illustrating a second reflector having an inclined surface and a horizontal surface.
Figure 17B:
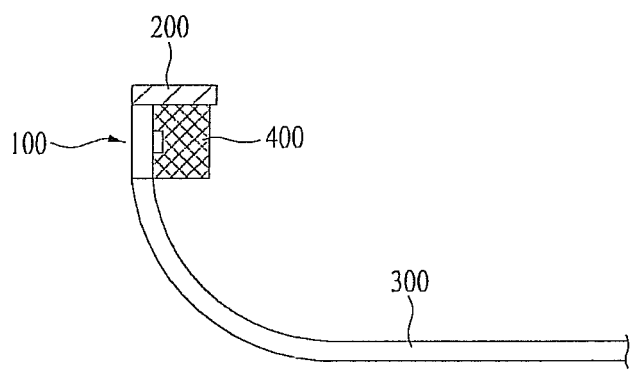
Figure 17C:
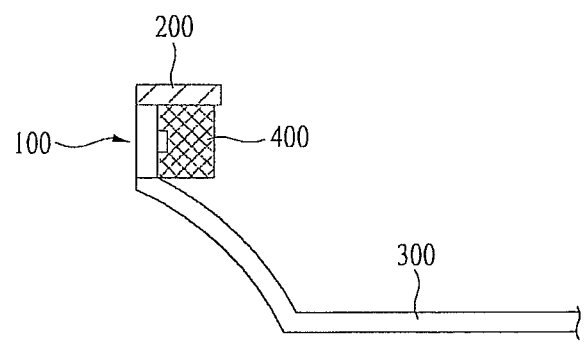

FIGS. 17A to 17C are views illustrating a second reflector having an inclined surface and a horizontal surface.

The second reflector 300 may have a flat inclined surface as illustrated in FIG. 17A, a concavely inclined surface as illustrated in FIG. 17B, or a convexly inclined surface as illustrated in FIG. 17C.

The third reflector 400 may overlap with the inclined surface of the second reflector 300.

In the embodiments, the second reflector 300 may include at least two inclined surfaces having at least one inflection point, and the first and second inclined surfaces, which are adjacent to each other about the inflection point, may have different curvatures.

Figure 18A:
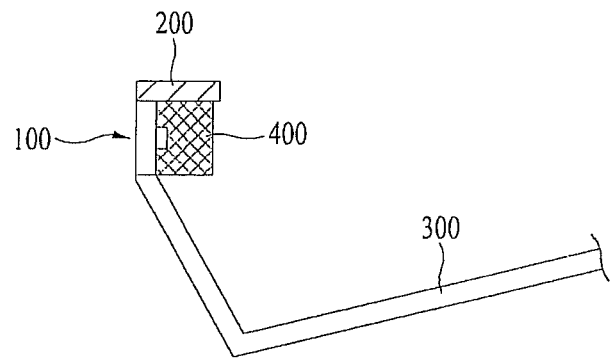
FIGS. 18A to 18C are views illustrating a second reflector having a plurality of inclined surfaces.
Figure 18B:
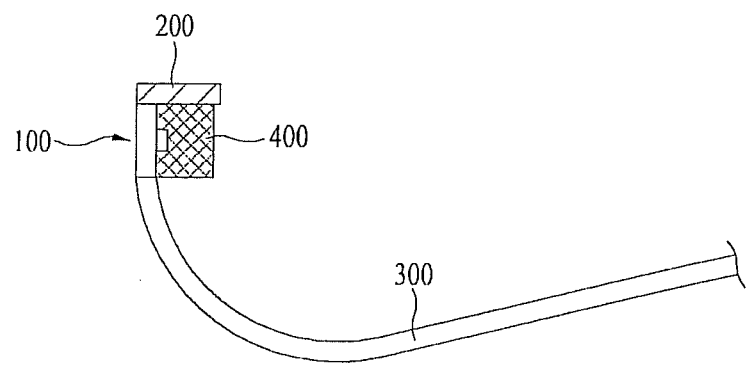
Figure 18C:
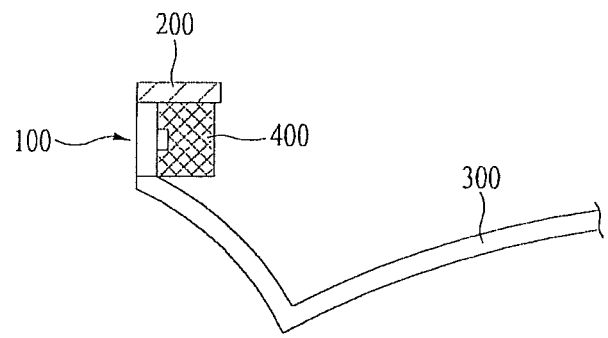

FIGS. 18A to 18C are views illustrating a second reflector having a plurality of inclined surfaces.

In FIG. 18A, there are provided two adjacent flat inclined surfaces having different gradients. In FIG. 18B, there are provided two adjacent concavely inclined surfaces having different curvatures. Also, in FIG. 18C, there are provided two adjacent convexly inclined surfaces having different curvatures.

The third reflector 400 may overlap with the inclined surface of the second reflector 300.

As described above, the inclined surface of the second reflector 300 may be at least one of a concavely inclined surface, a convexly inclined surface and a flat inclined surface.

The second reflector 300 may include a specular-reflection area and a diffuse-reflection area.

The specular-reflection area may serve to reflect incident light in a given direction, and the diffuse-reflection area may serve to reflect incident light in several directions. The reflectivity of the specular-reflection area and the diffuse-reflection area may be in a range of about 50~99.99%.

A part of or all the inclined surface of the second reflector 300 may be the specular-reflection area.

Figure 19:
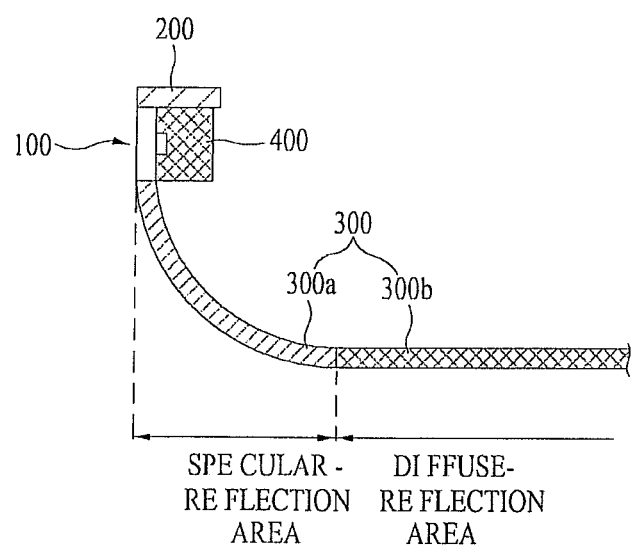
FIG. 19 is a view illustrating a second reflector having a specular-reflection area and a diffuse-reflection area.

FIG. 19 is a view illustrating the second reflector having a specular-reflection area and a diffuse-reflection area.

As illustrated in FIG. 19, the second reflector 300 may include a specular-reflection area 300a disposed close to the light source module 100 and a diffuse-reflection area 300b disposed at a distance from the light source module 100.

The specular-reflection area 300a may occupy about 5~50% of the entire area of the second reflector 300.

As occasion demands, the specular-reflection area 300a may occupy about 20~30% of the entire area of the second reflector 300.

Also, in the second reflector 300, an area ratio of the specular-reflection area 300a to the diffuse-reflection area 300b may be 1:1 to 1:20.

Determining the area ratio of the specular-reflection area 300a and the diffuse-reflection area 300b of the second reflector 300 is to reduce luminance difference between a portion of the second reflector 300 close to the light source 100 and a portion of the second reflector 300 distant from the light source 110.

That is, appropriately adjusting the area ratio of the specular-reflection area 300a and the diffuse-reflection area 300b of the second reflector 300 may provide uniform luminance throughout the second reflector 300.

The second reflector 300 may be made of a metal or metal oxide having high reflectivity, such as aluminum (Al), silver (Ag), gold (Au), titanium dioxide ($TiO_2$) or the like. In the second reflector 300, the specular-reflection area 300a and the diffuse-reflection area 300b may be made of the same material and have different surface roughness values.

In one example, the specular-reflection area 300a and the diffuse-reflection area 300b of the second reflector 300 may be made of the same material and have different surface roughness values.

In another example, the specular-reflection area 300a and the diffuse-reflection area 300b of the second reflector 300 may be made of different materials and have different surface roughness values.

At least one of the light source 110 and the first and third reflectors 200 and 400 may overlap with the specular-reflection area 300a.

Specifically, at least one of the first and third reflectors 200 and 400 may partially or wholly overlap with the specular-reflection area 300a of the second reflector 300.

The specular-reflection area 300a of the second reflector 300 may be located close to the light source module 100 and serve to reflect light emitted from the light source 110 to the central portion of the second reflector 300. The diffuse-reflection area 300b of the second reflector 300 may be located at the central portion of the second reflector 300 and serve to diffuse incident light.

The second reflector 300 may be formed to have various shapes according to arrangement of the light source module 100 and the third reflector 400.

Figure 20A:
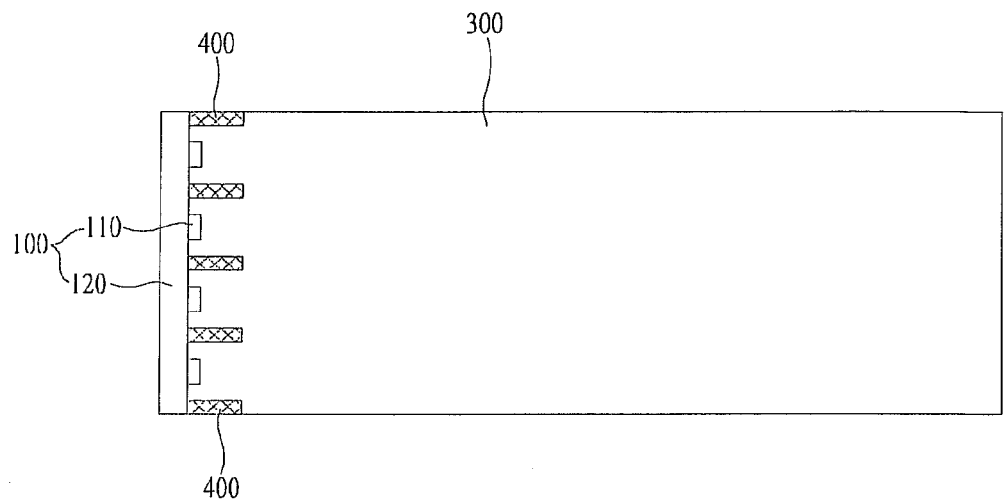
FIG. 20A is a view illustrating a one-edge type second reflector.
Figure 20B:
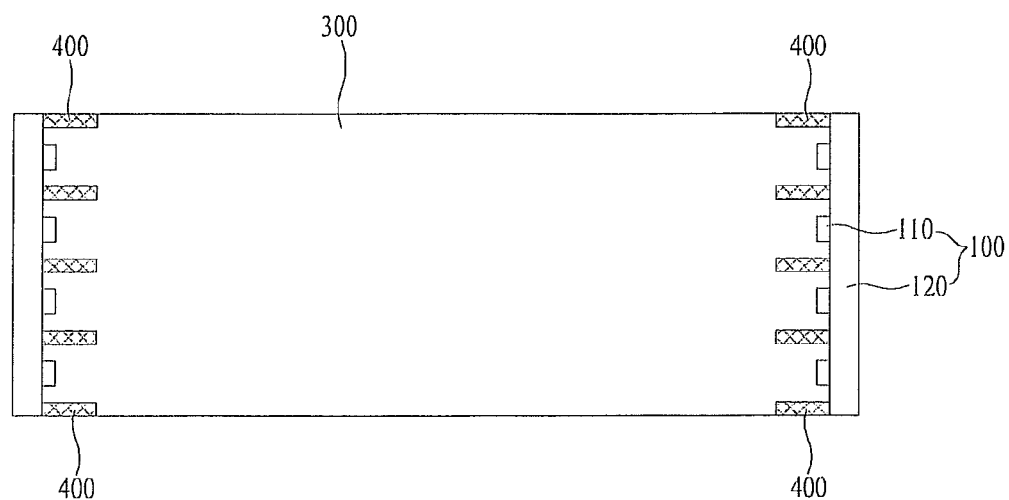
FIG. 20B is a view illustrating a two-edge type second reflector.
Figure 20C:
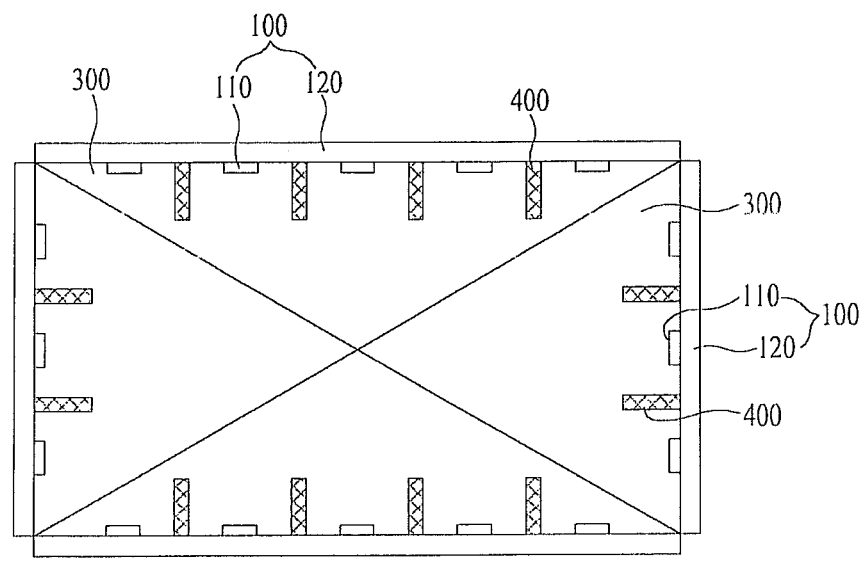
FIGS. 20C and 20D are views illustrating a four-edge type second reflector.
Figure 20D:
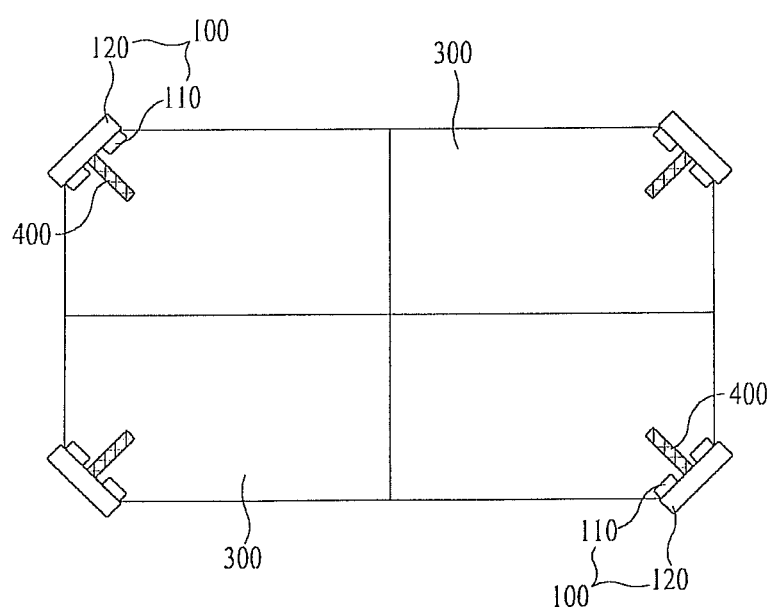

FIG. 20A is a view illustrating a one-edge type second reflector, FIG. 20B is a view illustrating a two-edge type second reflector, and FIGS. 20C and 20D are views illustrating a four-edge type second reflector.

FIG. 20A is a plan view illustrating a one-edge type second reflector. As illustrated in FIG. 20A, the one-edge type second reflector 300 may be provided at one edge thereof with the light source module 100 and the third reflector 400 may be disposed between adjacent light sources 110 of the light source module 100.

FIG. 20B is a plan view illustrating a two-edge type second reflector. As illustrated in FIG. 20B, the two-edge type second reflector 300 may be provided at two edges thereof with the light source modules 100 and the third reflector 400 may be disposed between adjacent light sources 110 of the light source module 100.

FIG. 20C is a plan view illustrating a four-edge type second reflector. As illustrated in FIG. 20C, the four-edge type second reflector 300 may be provided at four edges thereof with the light source modules 100 and the third reflector 400 may be disposed between adjacent light sources 110 of the light source module 100.

FIG. 20D is a plan view illustrating a four-edge type second reflector. As illustrated in FIG. 20D, the four-edge type second reflector 300 may be provided at four corners thereof with the light source modules 100 and the third reflector 400 may be disposed between adjacent light sources 110 of the light source module 100.

In the embodiments, the backlight unit may further include an optical member disposed at a predetermined distance from the second reflector 300 to define a space therebetween. An air guide may be provided in the space between the second reflector 300 and the optical member.

Figure 21:
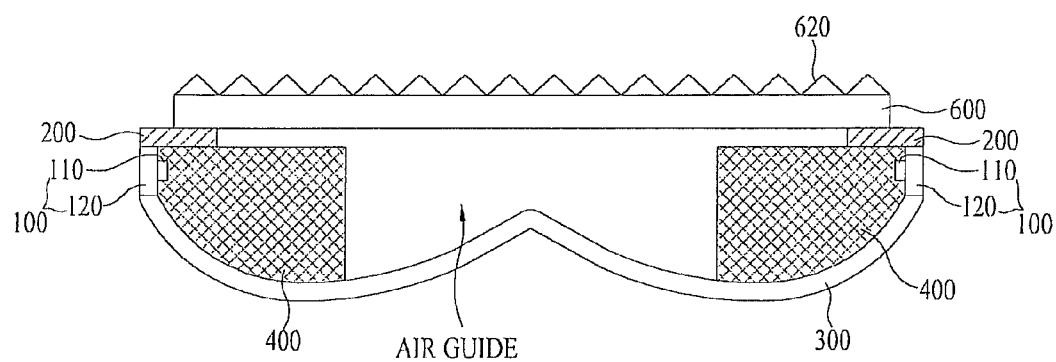
FIG. 21 is a view illustrating a backlight unit including an optical member.
Figure 22:
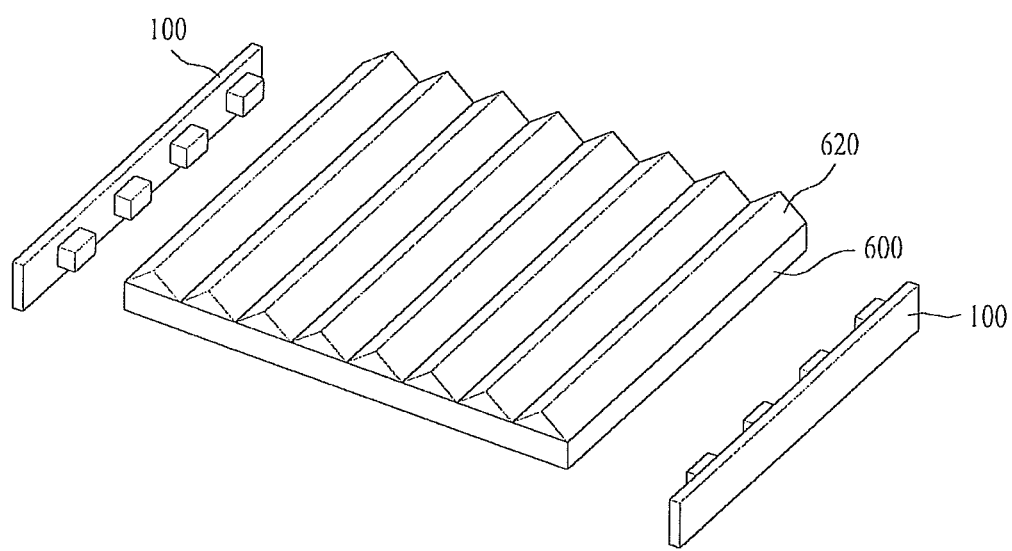
FIG. 22 is a view illustrating one example of the shape of an optical member.

FIG. 21 is a view illustrating a backlight unit including an optical member, and FIG. 22 is a view illustrating one example of the shape of the optical member.

As illustrated in FIG. 21, the optical member 600 may be disposed over an opening of the first reflector 200 and may have a roughened pattern 620 on an upper surface thereof.

The optical member 600 serves to diffuse light emitted through the opening of the first reflector 200 and the roughened pattern 620 formed on the upper surface of the optical member 600 may serve to increase light diffusion efficiency.

The roughened pattern 620, as illustrated in FIG. 22, may be a stripped pattern aligned in a longitudinal direction of the light source module 100.

The roughened pattern 620 may be defined by raised portions on the upper surface of the optical member 620 and each raised portion consists of a facing first surface and second surface, an angle therebetween being an acute angle or an obtuse angle.

As occasion demands the optical member 600 may include at least one sheet selected from among a diffusion sheet, a prism sheet, a luminance increasing sheet and the like.

The diffusion sheet serves to diffuse light emitted from a light source, the prism sheet serves to guide the diffused light to a light emission area, and the luminance increasing sheet serves to increase luminance.

As described above, by additionally providing the third reflector between adjacent light sources of the light source module, enhanced uniform luminance may be accomplished.

In the embodiments, a light emission surface of the light source module may be oriented in various directions.

Specifically, the light source module may be of a direct emitting type in which the light emission surface is oriented toward the air guide between the optical member and the second reflector, or may be of an indirect emitting type in which the light emission surface is oriented toward any one of the first reflector, the second reflector and a cover plate.

Light emitted from the indirect emitting type light source module may be reflected from the first reflector, the second reflector and the cover plate and the reflected light may be directed toward the air guide of the backlight unit.

The indirect emitting type light source module serves to reduce hot spot phenomenon.

In the embodiments, a plurality of reinforcing ribs may be disposed at the lower surface of the second reflector.

Figure 23:
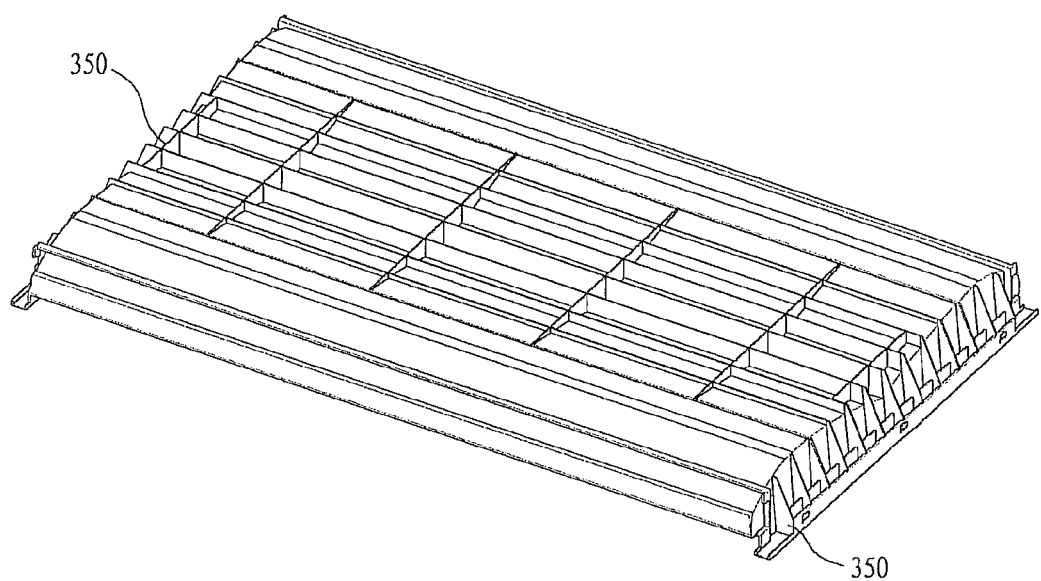
FIG. 23 is a view illustrating reinforcing ribs formed at a lower surface of a second reflector.

FIG. 23 is a view illustrating the reinforcing ribs formed at the lower surface of the second reflector. As illustrated in FIG. 23, a plurality of reinforcing ribs 350 may be disposed on the lower surface of the second reflector 300.

The reinforcing ribs 350 may serve to prevent deformation of the second reflector 300 because a curved reflective surface of the second reflector 300 may be easily deformed by external shock.

The reinforcing ribs 350 may be formed at the lower surface of the second reflector opposite to the inclined surface and a lateral surface of the second reflector.

A plurality of support pins may be formed at the upper surface of the second reflector to support the optical member.

Figure 24:
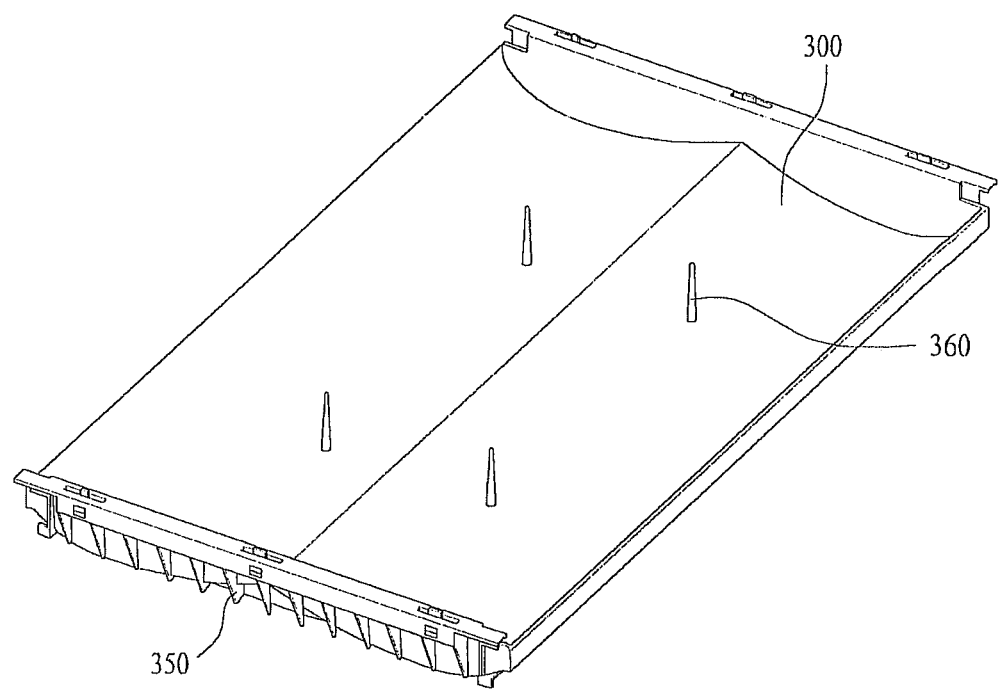
FIG. 24 is a view illustrating support pins formed at an upper surface of a second reflector.

FIG. 24 is a view illustrating support pins formed at the upper surface of the second reflector. As illustrated in FIG. 24, the support pins 360 to support the optical member may be formed at the upper surface of the second reflector 300.

Since the optical member is spaced apart from the second reflector 300 to define the air guide therebetween, a central portion of the optical member may sag. Thus, the support pins 360 serve to support the sagged optical member.

The support pins 360 may have a stable configuration in which the area of a lower surface thereof coming into contact with the second reflector 300 is greater than the area of an upper surface thereof.

Circuit devices to drive the light source module may be disposed under the inclined surface of the second reflector.

A space is defined under the lower surface of the second reflector between adjacent inclined surfaces of the second reflector. Arranging the circuit devices in the corresponding space enables efficient space utilization.

Figure 25:
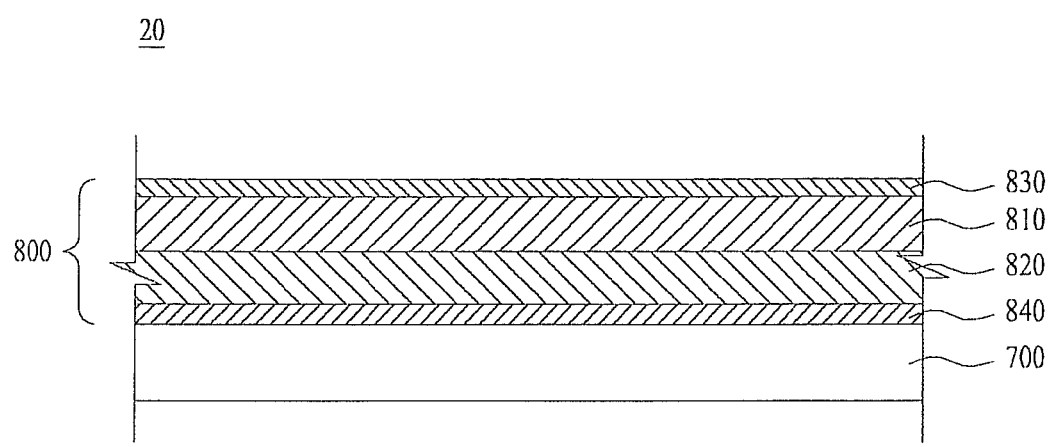
FIG. 25 is a view illustrating a display module including a backlight unit in accordance with an embodiment.

FIG. 25 is a view illustrating a display module having a backlight unit in accordance with an embodiment.

As illustrated in FIG. 25, the display module 20 may include a display panel 800 and a backlight unit 700.

The display panel 800 may include a color filter substrate 810 and a Thin Film Transistor (TFT) substrate 820, which are bonded to face each other with a uniform cell gap therebetween. A liquid crystal layer (not shown) may be interposed between the two substrates 810 and 820.

An upper polarizing plate 830 and a lower polarizing plate 840 may respectively define an upper surface and a lower surface of the display panel 800. More particularly, the upper polarizing plate 830 may be disposed at an upper surface of the color filter substrate 810 and the lower polarizing plate 840 may be disposed at a lower surface of the TFT substrate 820.

Although not illustrated, gate and data drivers may be provided at a lateral surface of the display panel 800, to generate drive signals required to drive the panel 800.

Figure 26:
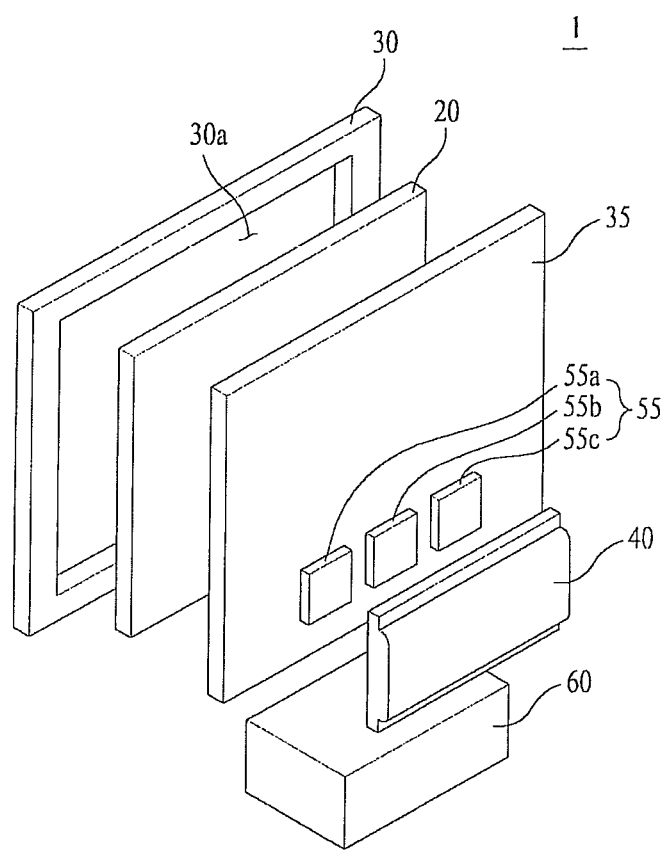
FIGS. 26 and 27 are views illustrating a display apparatus in accordance with an embodiment.
Figure 27:
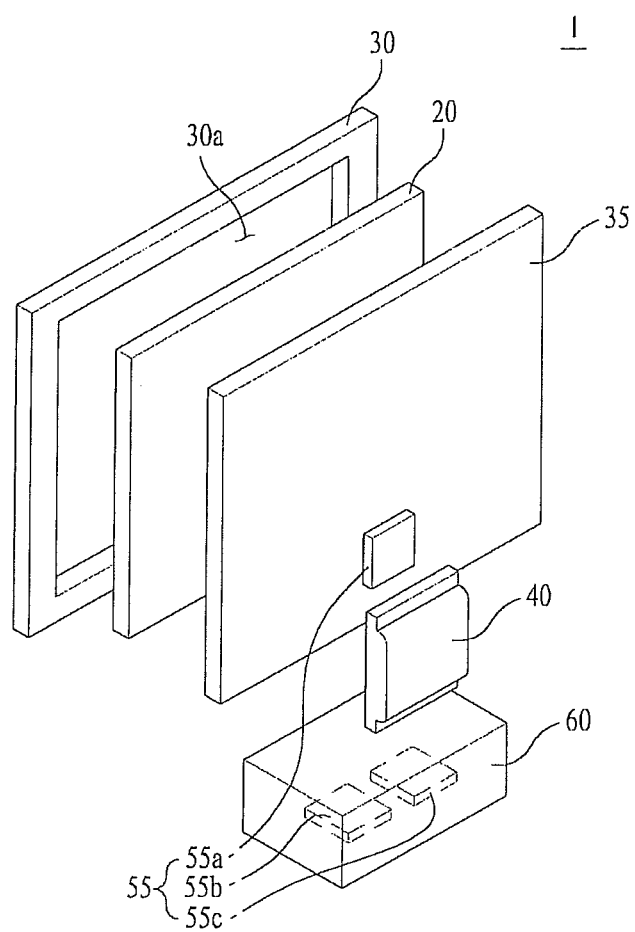

FIGS. 26 and 27 are views illustrating a display apparatus in accordance with an embodiment.

Referring to FIG. 26, the display apparatus 1 may include the display module 20, a front cover 30 to surround the display module 20, a back cover 35, a drive unit 55 provided at the back cover 35, and a drive unit cover 40 to enclose the drive unit 55.

The front cover 30 may include a transparent front panel (not shown) to transmit light. The front cover 30 serves to protect the display module 20 spaced apart therefrom by a predetermined distance and transmit light emitted from the display module 20, allowing an image displayed on the display module 20 to be seen from the outside.

The back cover 35 may be coupled to the front cover 30 so as to project the display module 20.

The drive unit 55 may be attached to a surface of the back cover 35.

The drive unit 55 may include a drive controller 55a, a main board 55b and a power supply 55c.

The drive controller 55a may be a timing controller. The drive controller 55a serves to adjust an operation timing of each driver IC of the display module 20. The main board 55b may serve to transmit V-sync, H-sync and R, G and B resolution signals to the timing controller. The power supply 55c supplies power to the display module 20.

The drive unit 55 may be attached to the back cover 35 and enclosed by the drive unit cover 40.

The back cover 35 has a plurality of holes, through which the display module 20 may be connected to the drive unit 55. Also, a stand 60 to support the display apparatus 1 may be provided.

In an alternative embodiment, as illustrated in FIG. 27, the drive controller 55a of the drive unit 55 may be provided at the back cover 35, whereas the main board 55b and the power supply 55c may be provided in the stand 60.

The drive unit cover 40 may be configured to enclose only the drive unit 55 provided at the back cover 35.

Although the present embodiment illustrates the main board 55b and the power supply 55c as being provided separately, they may be integrated, without being limited thereto.

In the embodiments, the light source module may further include a lens.

Figure 28A:
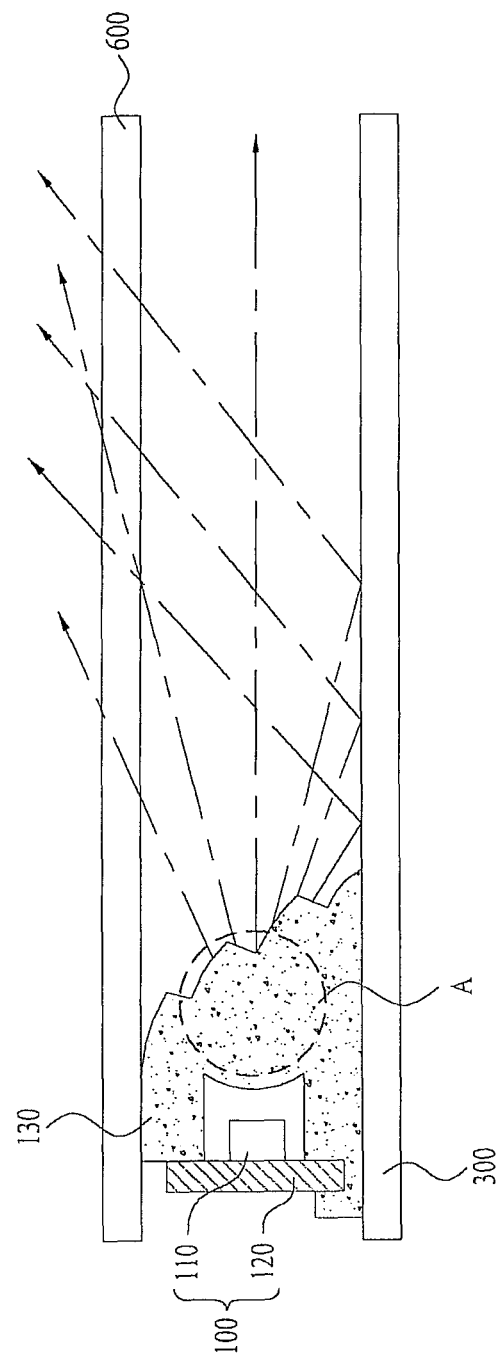
FIG. 28A is a sectional view illustrating a backlight unit having a lens.
Figure 28B:
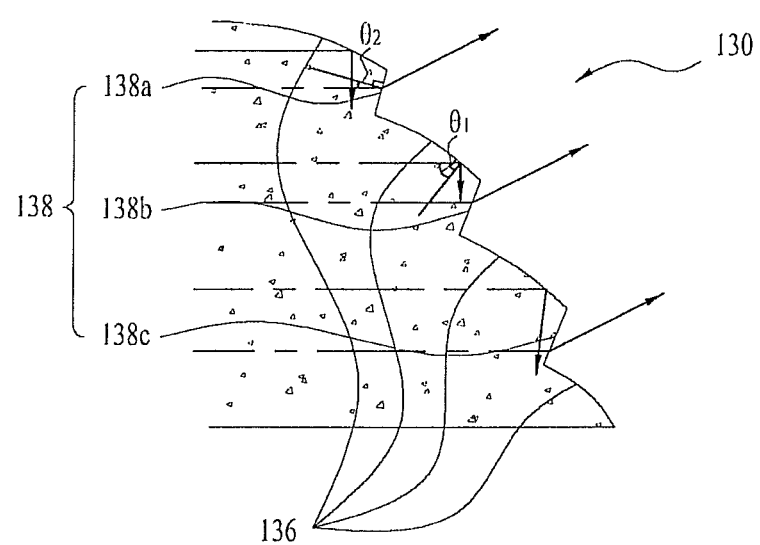
FIG. 28B is an enlarged view of the portion A of FIG. 28A.

FIG. 28A is a sectional view illustrating a backlight unit having a lens, and FIG. 28B is an enlarged view of the portion A of FIG. 28A.

As illustrated in FIGS. 28A and 28B, the light source module 100 may include the light source 110, the circuit board 120 and a lens 130.

Light having passed through the lens 130 may be reflected by the second reflector 300 and be directed to the optical member 600.

The lens 130 serves to scatter light emitted from the light source 110, allowing the light to be distributed throughout the second reflector 300 and the optical member 600.

Thus, the lens 130 may be made of a material having high light transmittance. For example, the lens 130 may be made of polymethylmethacrylate (PMMA), polycarbonate (PC), polyethylene (PE) or injection molding resin.

As illustrated, the lens 130 may include at least one first surface 136, an incidence angle of light from the light source 110 to the first surface 136 being greater than the critical angle, and at least one second surface 138, an incidence angle of light from the light source 110 to the second surface 138 being less than the critical angle.

The first surface 136 and the second surface 138 of the lens 130 may be repeated twice or more.

The lens 130 having the above described configuration may transmit a part of light from the light source 110, but may totally reflect the remaining part of the light into the lens 130 and then, again transmit the reflected light.

As such, the lens 130 may realize uniform and more distant distribution of light toward the second reflector 300 and the optical member 600.

This will be described as follows.

When light travels from an optically denser medium to a less dense medium, at an incidence angle greater than the critical angle, the light is no longer refracted, but reflected back into the original medium. This is called total internal reflection. The minimum value of the incidence angle causing such total reflection is referred to as the critical angle.

In the embodiment, to cause total reflection, the lens 130 must be denser than air and an index of refraction of the lens 130 must be 1 or more.

An angle $\theta_1$ between light directed from the light source 110 onto the first surface 136 of the lens 130 and the normal of the lens 130 is greater than the critical angle $\theta_c$ and therefore, the light is totally reflected into the lens 130.

Also, an angle $\theta_2$ between the light directed from the light source 110 onto the second surface 138 of the lens 130 and the normal of the lens 130 is less than the critical angle $\theta_c$ and therefore, the light is refracted outward from the lens 130. In this case, the refraction angle depends on Snell's law.

In the embodiment, a plurality of second surfaces 138a, 138b and 138c is disposed between a plurality of first surfaces 136, and the incidence angles of light at the first and second surfaces 136 and 138 are respectively greater than or less than the critical angle $\theta_c$, allowing a part of the light to be refracted from the lens 130 and a part of the light to be totally reflected into the lens 130.

For example, assuming that the lens 130 is made of glass and light travels from the glass lens 130 to air, the critical angle is 42 degrees. If the incidence angle of light is greater than the critical angle, the light is totally reflected into the lens 130 without traveling to the air.

As such, the performance of the lens 130 may be adjusted by respectively providing the first surface 136 and the second surface 138 with the incidence angle of light equal to or greater than the critical angle, or less than the critical angle.

That is, the light introduced into the lens 130 may be transmitted far away without loss.

The second reflector 300 may also serve to allow light emitted from the light source module 100 to be reflected as planar light, which enhances optical efficiency.

Figure 29A:
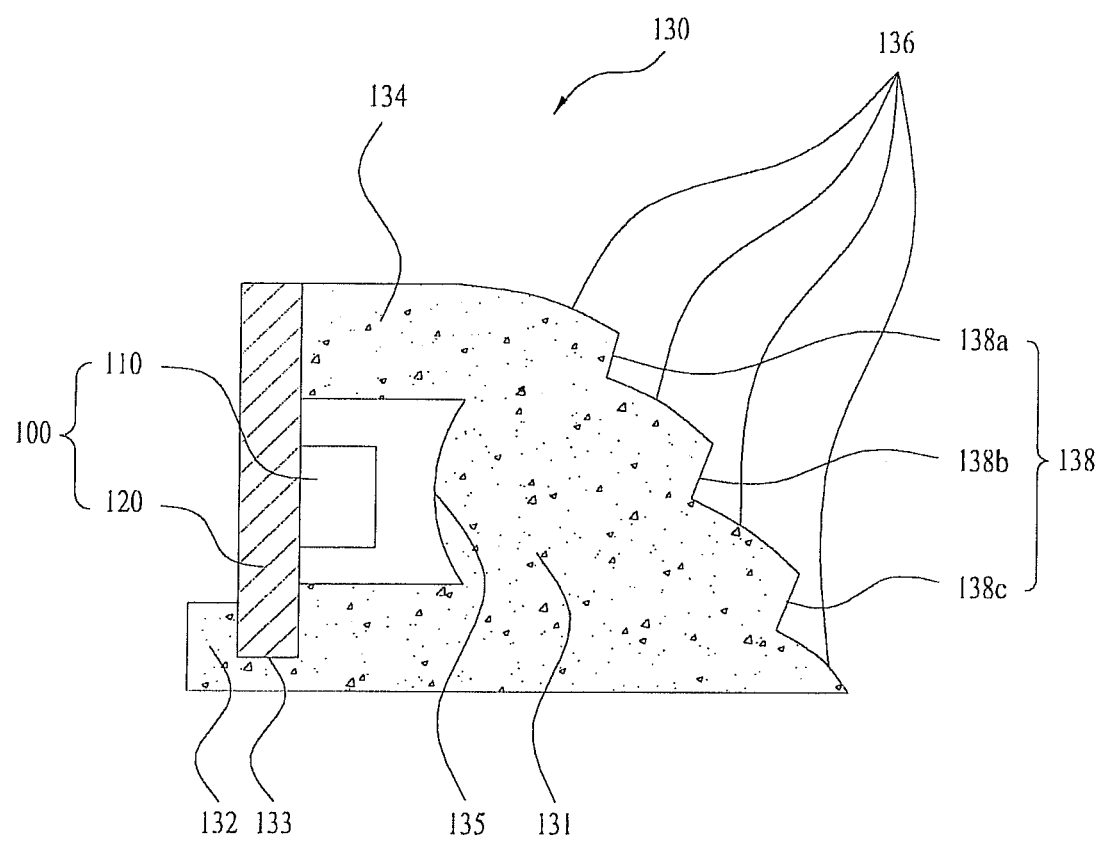
FIGS. 29A to 29C are sectional views illustrating a light source module having the lens of FIG. 28A.
Figure 29B:
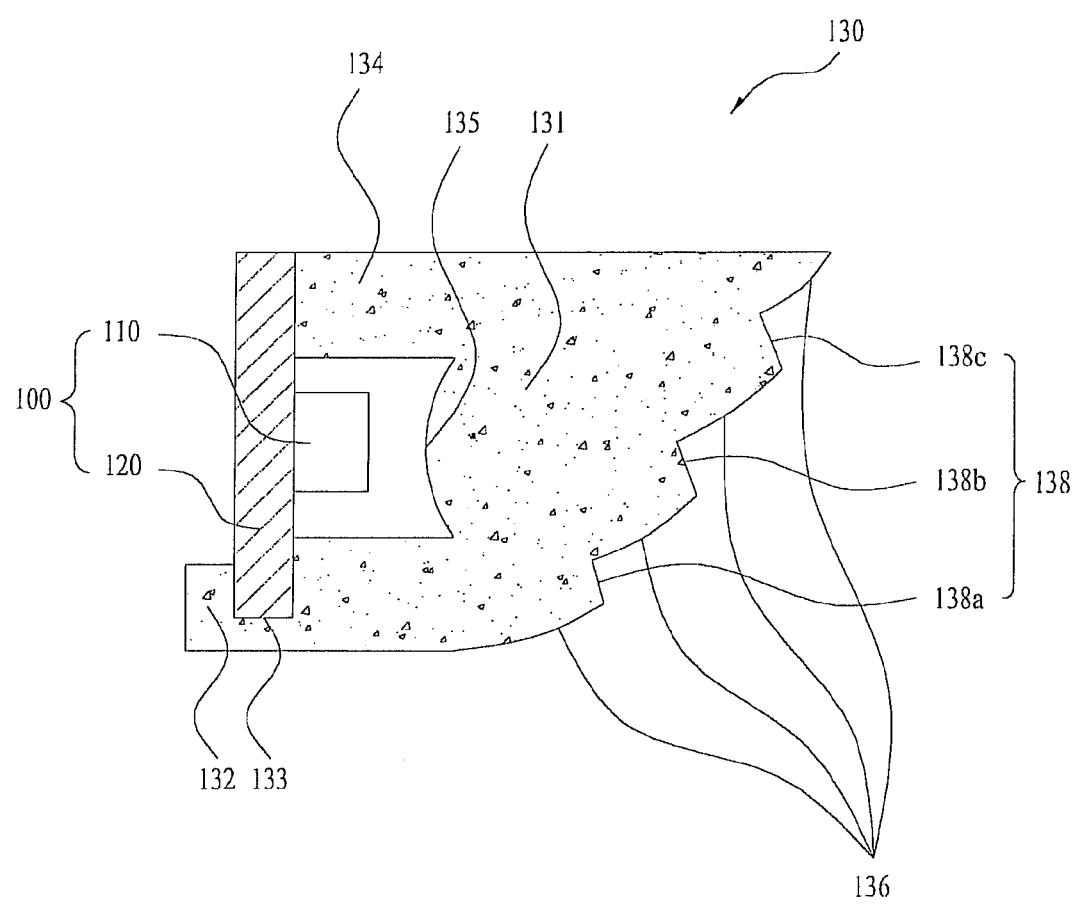
Figure 29C:
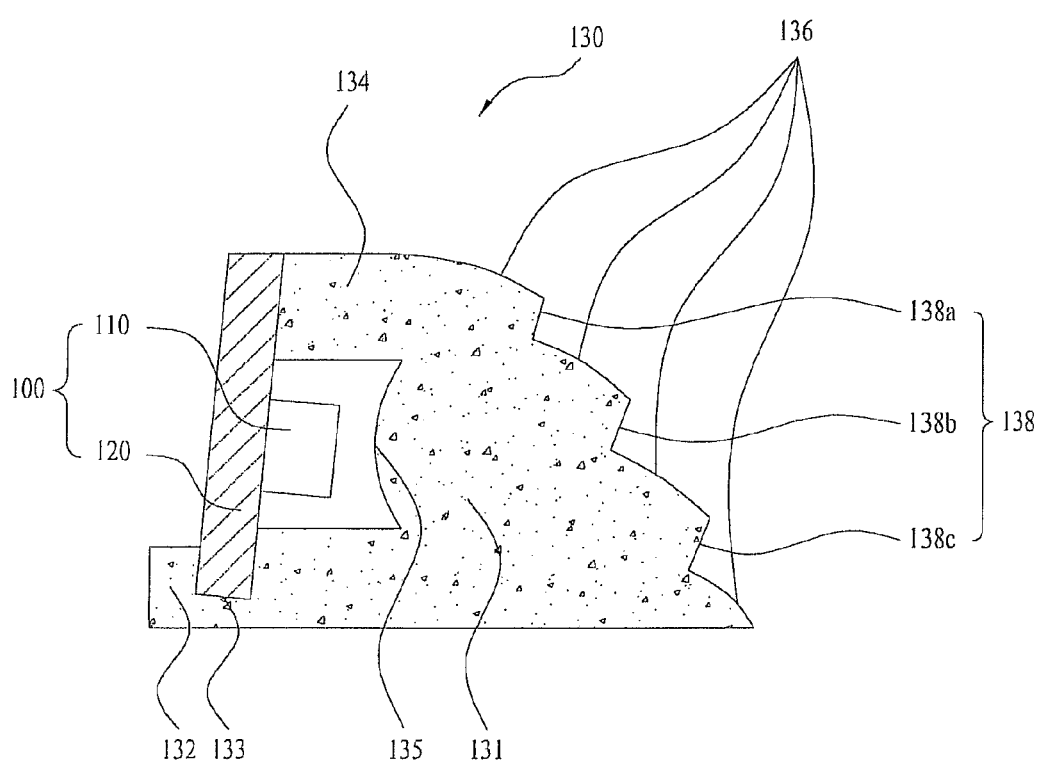

FIGS. 29A to 29C are sectional views illustrating a light source module having the lens of FIG. 28A.

FIGS. 29A and 29B illustrate upside-down configurations of the lens 130.

The light source module 100 having the above described lens 130 can uniformly transmit light to a position distant from the backlight unit, owing to total reflection and refraction of light.

The lens 130 further includes a light incidence portion 135, through which light from the light source 110 is introduced, and a light transfer portion 131, in addition to the first and second surfaces 136 and 138 from which the light is emitted to the outside.

The lens 130 may further include a support portion 132 to support the light source module 100 and a fixing portion 134 secured to the light source module 100 so as to integrate the lens 130 and the light source module 100 with each other.

In this case, the circuit board 120 of the light source module 100 is inserted into and fixed to a recess 133 indented in the lens 130.

In the embodiment illustrated in FIG. 29C, the recess 133 of the lens 130 and the circuit board 120 may be obliquely indented rather than being vertically indented.

This allows light emitted from the light source 110 to obliquely travel toward the second reflector 300, rather than traveling parallel to the optical member 600.

Here, since the circuit board 120 does not extend perpendicular to the optical member 600, the circuit board 120 may have an acute angle or an obtuse angle with respect to the optical member 600.

FIG. 30A is a view illustrating light distribution of a backlight unit having a lens, and FIG. 30B is a view illustrating light distribution of a backlight unit having no lens.

In the backlight unit having no lens, light emitted from the light source 110 exhibits Lambertian scattering. As illustrated in FIG. 30B, light emitted from the light source 110 is concentrated on the vicinity of the light source module 100, rather than being distributed throughout the second reflector 300 and the optical member 600. This irregular light distribution may result in irregular luminance.

On the other hand, in the case of the backlight unit having the lens 130, as illustrated in FIG. 30A, the light emitted from the light source 110 is first totally reflected into the lens 130 and then, is uniformly transmitted to the outside of the lens 130, which results in uniform light distribution throughout the second reflector 300 and the optical member 600.

The backlight unit in accordance with the embodiment does not use a light guide plate and can achieve uniform light distribution throughout a surface of a panel owing to total reflection and refraction characteristics of the lens 130.

In this case, since the quantity of light transmitted to a panel close to the light source module may be relatively large, the following configuration to realize uniform light transmission over the entire panel may be provided.

FIGS. 31A to 31F are views illustrating other embodiments of FIG. 28A.

In the embodiments, the backlight unit includes at least one of a reflective layer 142 and a light scattering layer 144 provided at a partial inner surface of the optical member 600 having a diffusion sheet.

In this case, the size or density of the reflective layer 142 or the light scattering layer 144 on the optical member 500 close to the light source module 100 may be adjusted.

Figure 31A:
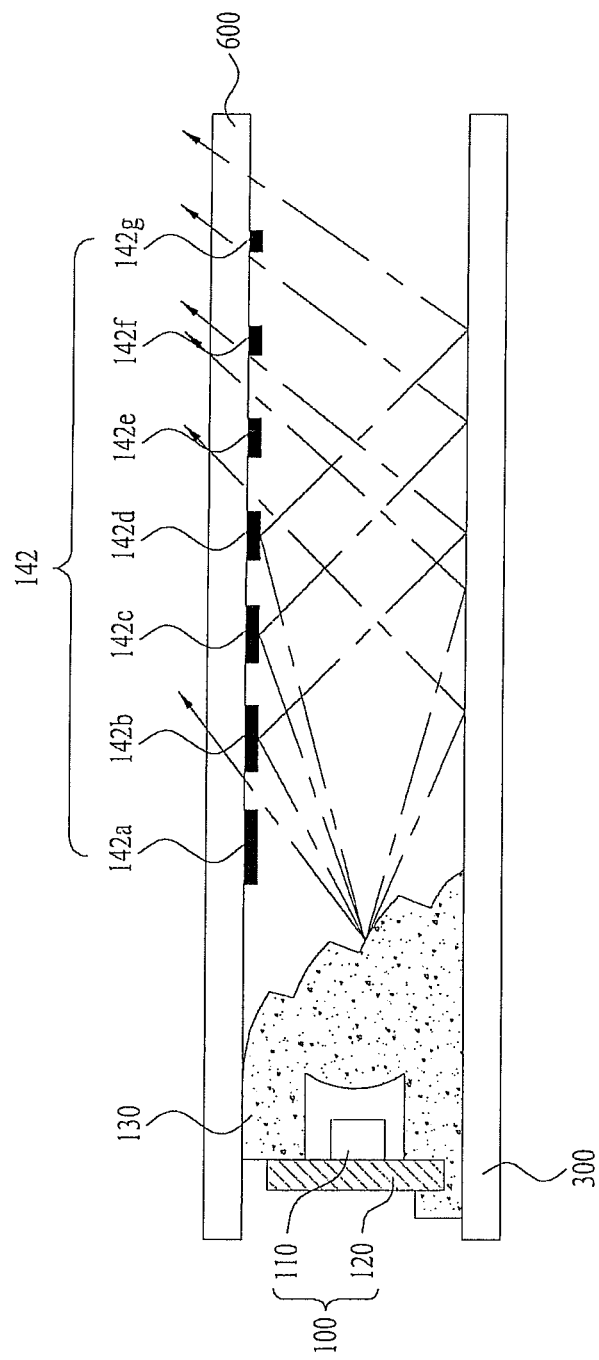

In the embodiment illustrated in FIG. 31A, the reflective layer 142 is disposed on the inner surface of the optical member 600.

Here, the inner surface is a surface facing the second reflector 300.

The reflective layer 142 may be made of a material having high reflectivity, such as silver (Ag), aluminum (Al) or the like.

In the embodiment, assuming that the reflective layer 142 consists of a plurality of reflective layer parts 142a, 142b, 142c, 142d, 142e, 142f and 142g, the reflective layer part closest to the lens 130 has the largest width and the interval between adjacent reflective layer parts close to the lens 130 is relatively narrow.

In other words, as the distance from the lens 130 increases, the width of the respective reflective layer parts 142a, 142b, 142c, 142d, 142e, 142f and 142g decreases and the interval between adjacent reflective layer parts increases. That is, the density of the reflective layer 142 decreases with increasing distance from the lens 130, which provides a portion of the optical member 600 distant from the lens 130 with an increased light transmission area.

Thus, it is possible to reduce transmission of light through the optical member 600 with respect to a region close to the lens 130 where a relatively large quantity of light is obtained, which enables uniform transmission of light through the entire optical member 600.

The above described configuration may be accomplished even when, instead of the reflective layer 142, the light scattering layer 144 is distributed as illustrated in FIG. 31A.

Figure 31B:
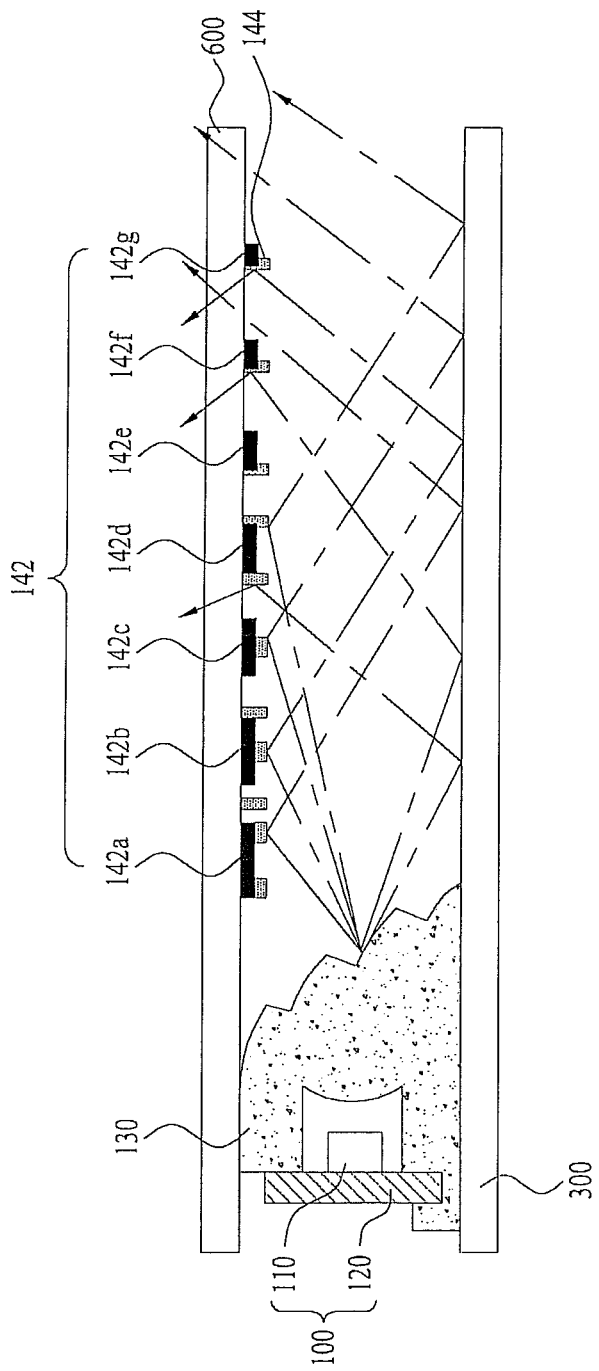

In the embodiment illustrated in FIG. 31B, both the reflective layer 142 and the light scattering layer 144 may be disposed on the inner surface of the optical member 600.

In this case, similar to FIG. 31A, the width of the respective reflective layer parts 142a, 142b, 142c, 142d, 142e, 142f and 142g of the reflective layer 142 decreases and the interval between adjacent reflective layer parts increases with increasing distance from the lens 130.

Assuming that the light scattering layer 144 consists of a plurality of light scattering layer parts, in the embodiment, all the light scattering layer parts may have the same width and the interval between adjacent light scattering layer parts is constant. Moreover, some of the light scattering layer parts 144 may be disposed on the reflective layer parts and some of the light scattering layer parts 144 may be directly disposed on the optical member 600.

The light scattering layer 144 may be made of $TiO_2$ or $Al_2O_3$ and does not shield the entire opening of the optical member 600.

In the embodiment, the light scattering layer 144, which has the same arrangement or density as that of the reflective layer 142 illustrated in FIG. 31A, may be provided to achieve uniform distribution of light transmitted through the optical member 600.

Figure 31C:
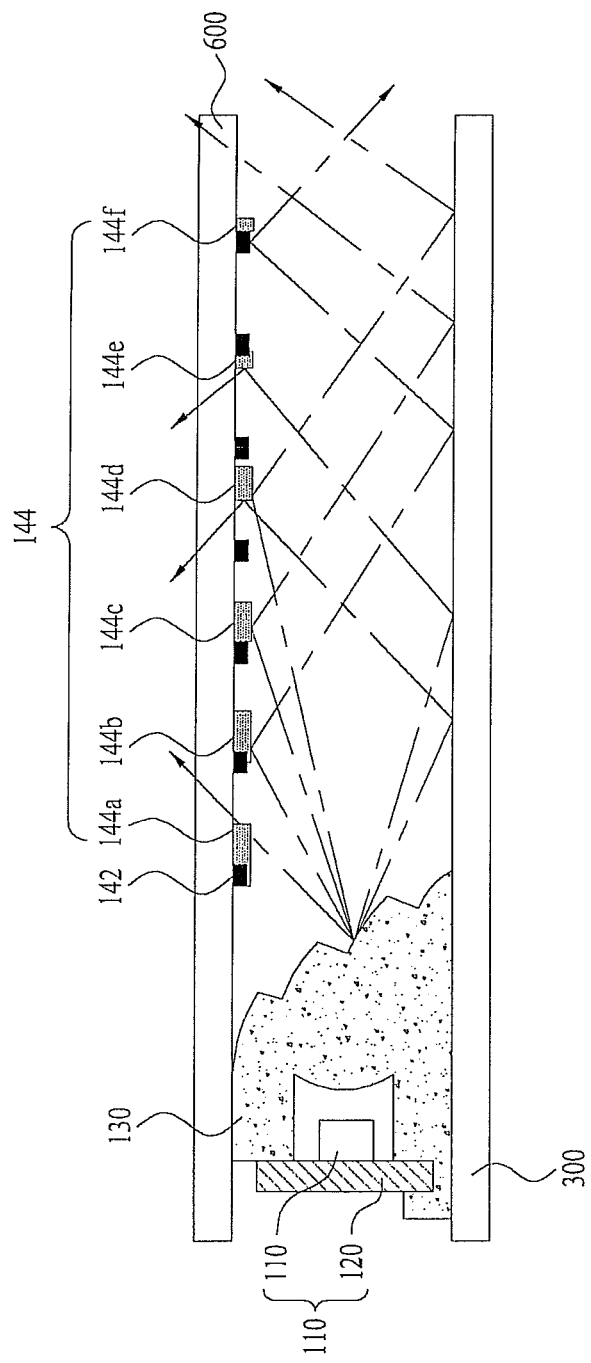

In the embodiment illustrated in FIG. 31C, differently from the embodiment illustrated in FIG. 31B, the reflective layer parts of the reflective layer 142 may have the same width and be disposed at the same interval, and the density of the light scattering layer 144 may decrease with increasing distance from the lens 130.

Specifically, as the distance from the lens 130 increases, the width of the respective light scattering layer parts 144a, 144b, 144c, 144d, 144e and 144f decreases and the interval between adjacent light scattering layer parts increases. That is, the density of the light scattering layer 144 decreases with increasing distance from the lens 130, which provides a portion of the optical member 600 distant from the lens 130 with an increased light transmission area.

In the embodiment illustrated in FIG. 31D, the respective reflective layer parts 142a, 142b, 142c, 142d and 142e of the reflective layer 142 have a multi-layered form and the density of the reflective layer 142 decreases as increasing distance from the lens 130.

Specifically, as the distance from the light source module 100 increases, the width of the respective reflective layer parts 142a, 142b, 142c, 142d and 142e constituting the reflective layer 142 decreases and the interval between adjacent reflective layer parts increases, which provides a portion of the optical member 600 distant from the light source module 100 with an increased light transmission area.

In the embodiment illustrated in FIG. 31E, the respective light scattering layer parts 144a, 144b, 144c, 144d and 144e of the light scattering layer 144 have a multi-layered form and the density of the light scattering layer 144 decreases with increasing distance from the lens 130.

Specifically, as the distance from the light source module 100 increases, the width of the respective light scattering layer parts 144a, 144b, 144c, 144d and 144e constituting the light scattering layer 144 decreases and the interval between adjacent light scattering layer parts increases, which provides a portion of the optical member 600 distant from the light source module 100 with an increased light transmission area.

In the configurations illustrated in FIGS. 31D and 31E, each reflective layer part and each light scattering layer part may have a multi-layered form such that the thickness of the reflective layer part or the light scattering layer part decreases with increasing distance from the light source module 100.

More specifically, after the reflective layer 142 or the light scattering layer 144 is primarily formed throughout the optical member 600, a second reflective layer 142 or light scattering layer 144 may be formed on the first layer except for a region distant from the light source module 100 and then, a third reflective layer 142 or light scattering layer 144 may be formed on the second layer only at a region close to the light source module 100.

Thus, by adjusting the density of the reflective layer 142 or the light scattering layer 144 based on the width, thickness and interval thereof, light reflectivity can be adjusted.

In the embodiment illustrated in FIG. 31F, the respective light reflective parts of the light reflective layer 142 may have the same width and interval, the respective light scattering layer parts 144a, 144b, 144c, 144d and 144e of the light scattering layer 144 may have a multi-layered form, and the density of the light scattering layer 144 decreases with increasing distance from the lens 130.

Specifically, although the arrangement of the light scattering layer 144 is similar to that as illustrated in FIG. 31E, the respective multi-layered light scattering layer parts 144a, 144b, 144c, 144d and 144e have different engagement positions with respect to the respective light reflective layer parts.

In the embodiments illustrated in FIGS. 31A to 31F, the light reflective layer 142 and the light scattering layer 144 are disposed on the inner surface of the optical member 600 and the density (width and/or interval) of the light reflective layer 142 and the light scattering layer 144 is adjusted in such a manner that an opening rate of the optical member 600 increases with increasing distance from the lens 130, which results in enhanced uniform light distribution.

Figure 32A:
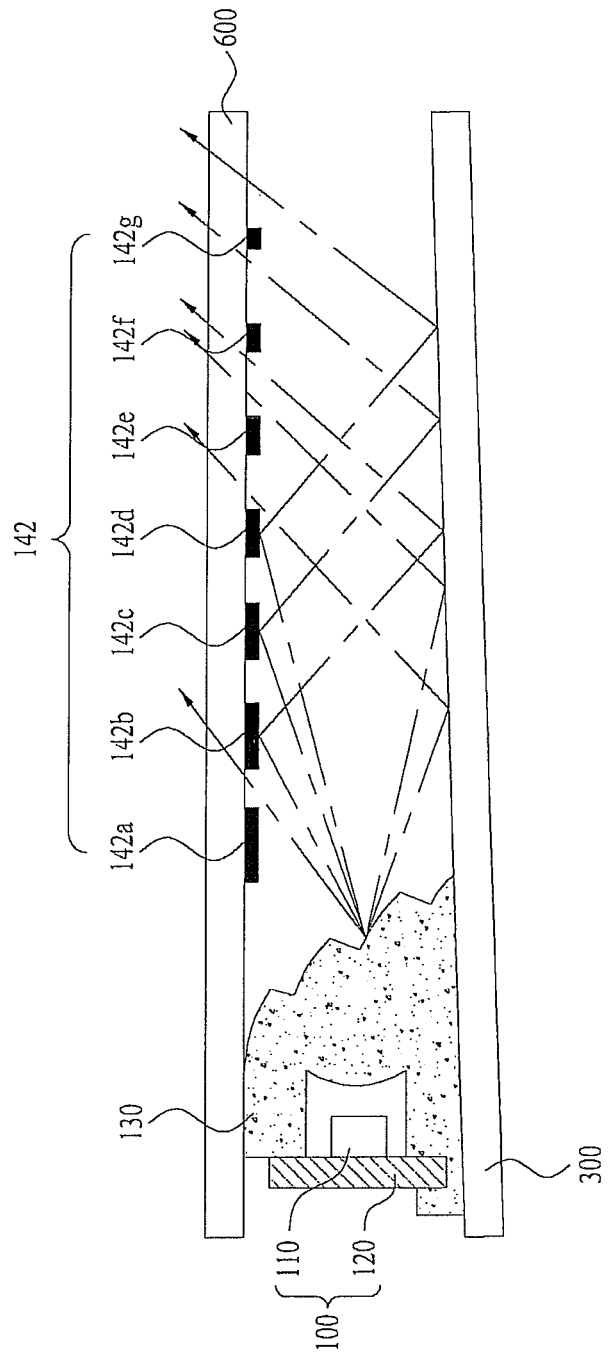

FIGS. 32A and 32B are views illustrating other embodiments of FIG. 28A.

As illustrated in FIGS. 32A and 32B, the second reflector 300 may be angled with respect to the optical member 600.

Specifically, although the second reflector 300 may be disposed parallel to the optical member 600, as illustrated in FIGS. 32A and 32B, the second reflector 300 may be angled with respect to the optical member 600.

In particular, tilting the second reflector 300 as described above may facilitate reflection of light even at a portion of the second reflector 300 distant from the lens 130.

In FIG. 32A, the second reflector 300 may have a flat inclined surface. In FIG. 32B, the second reflector 300 may have a curved inclined surface.

Figure 33:
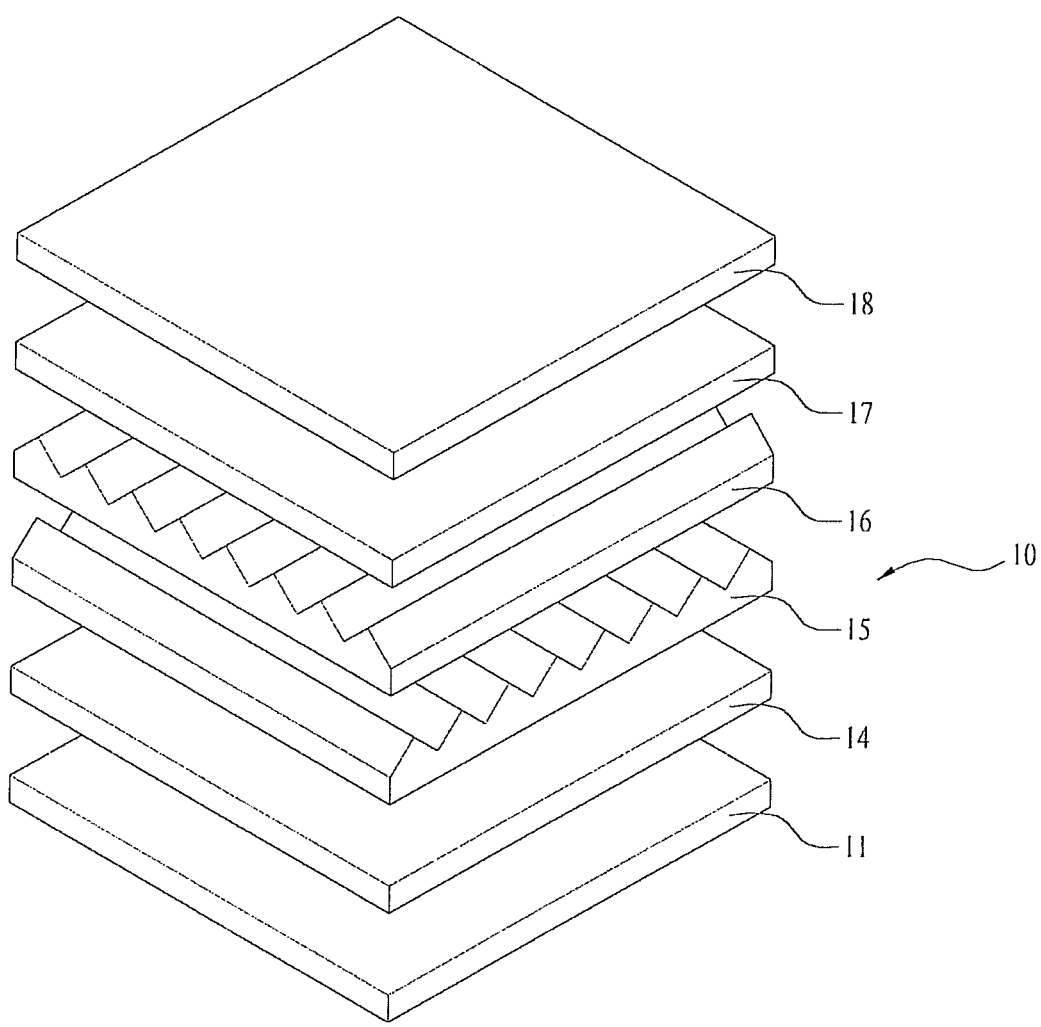
FIG. 33 is an exploded perspective view of a display apparatus in accordance with an embodiment.

FIG. 33 is an exploded perspective view of a display apparatus in accordance with an embodiment.

As illustrated in FIG. 33, the display apparatus 10 includes a backlight unit 11 having a light source module (not shown), a diffusion sheet 14 disposed on the backlight unit 11 to guide light emitted from the light source module forward of the display apparatus 10, a first prism sheet 15 and a second prism sheet 16 disposed in front of the diffusion sheet 14, a panel 17 disposed in front of the second prism sheet 16, and a color filter 18 disposed in front of the panel 17.

The diffusion sheet 14, the first prism sheet 15 and the second prism sheet 16 constitute an optical sheet. The optical sheet may have other combinations. For example, the optical sheet may take the form of a micro lens array, a combination of a diffusion sheet and a micro lens array, or a combination of a single prism sheet and a micro lens array.

The diffusion sheet 14 may be made of a polyester-based or polycarbonate-based material and serve to maximize a light transmission angle via refraction and scattering of light from the backlight unit 11.

The diffusion sheet 14 may include a support layer containing a light diffuser, and a first layer and a second layer respectively formed on a light emission surface (facing the first prism sheet) and a light incidence surface (facing a reflective sheet), the first and second layers containing no light diffuser.

The support layer may contain 0.1~10 wt parts of a siloxane-based light diffuser having an average particle diameter of 1~10 μm and 0.1~10 wt parts of an acryl-based light diffuser having an average particle diameter of 1~10 μm with respect to 100 wt parts of a mixture of a methacrylic acid-styrene copolymer resin and a methacrylic acid methyl-styrene copolymer resin.

The first layer and the second layer may contain 0.01~1 wt parts of an ultraviolet absorbent and 0.001~10 wt parts of an anti-static agent with respect to 100 wt parts of a methacrylic acid methyl-styrene copolymer resin.

In the diffusion sheet 14, the support layer may have a thickness of 100~1000 μm, and the first or second layer may have a thickness of 10~1000 μm.

The first prism sheet 15 may be formed by coating one surface of a support film with a transparent elastic polymer material. The first prism sheet 15 may have a prism layer in which a plurality of 3-dimensional structures is repeated.

Here, the plurality of structures may define a stripped pattern having repeated ridges and valleys.

The direction of ridges and valleys formed on one surface of the support film of the second prism sheet 16 may be perpendicular to the direction of ridges and valleys formed on one surface of the support film of the first prism sheet 15. This serves to allow the first and second prism sheets 15 and 16 to uniformly disperse light transmitted from the light source module and the reflective sheet toward the entire panel 17.

Although not illustrated, a protective sheet may be disposed on each prism sheet. The protective sheet may include protective layers formed on both surfaces of a support film thereof, the protective layers containing light diffusion particles and binders. Also, the prism layer may be made of a polymer material selected from the group of polyurethane, styrene butadiene copolymer, polyarcylate, polymethacrylate, polymethylmethacrylate, polyethylene terephthalate elastomer, polyisoprene and polysilicon.

The panel 17 may include a liquid crystal display panel. Alternatively, other kinds of display devices requiring a light source may be provided.

The panel 17 includes liquid crystals interposed between both glass substrates and polarizers disposed respectively on the glass substrates to realize light polarization. Here, the liquid crystals have intermediate characteristics between a liquid and solid. The liquid crystals, which are organic molecules having fluidity similar to a liquid, have a regular molecular arrangement. Thus, the liquid crystals serve to display an image as the molecular arrangement thereof varies by an external electric field.

The liquid crystal display panel used in the display apparatus is of an active matrix type and utilizes transistors as switches to adjust voltage applied to each pixel.

The color filter 18 is provided at a front surface of the panel 17 and serves to selectively transmit light from the panel 17 through Red, Green and Blue pixels, enabling display of an image.

As is apparent from the above description, according to the embodiments, a light source module is disposed between a first reflector and a second reflector and a third reflector is disposed between adjacent light sources of the light source module. This arrangement may provide an air guide type backlight unit which has light-weight design suited to mass-production and uniform luminance.

Further, according to the embodiments, light emitted from the light source module may be uniformly transmitted through the entire optical member, thus achieving uniform transmission of light to a panel.

Accordingly, the backlight unit may achieve enhanced reliability and economic efficiency.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A backlight unit comprising:
a first reflector;
a second reflector partially having an inclined surface;
a plurality of light sources disposed between the first reflector and the second reflector; and
a third reflector disposed between adjacent light sources.
2. The backlight unit according to claim 1, wherein the third reflector is spaced apart from the first reflector by a first distance and is spaced apart from the second reflector by a second distance.
3. The backlight unit according to claim 2, wherein the first distance and the second distance are different.
4. The backlight unit according to claim 1, wherein the third reflector comes into contact with at least one of the first reflector and the second reflector.

5. The backlight unit according to claim 1, wherein one or a plurality of light sources is disposed between adjacent third reflectors.

6. The backlight unit according to claim 1, wherein the third reflector includes:
   first and second segments disposed at opposite sides of the light source; and
   a third segment connected to the first and second segments and located between the first reflector and the light source.

7. The backlight unit according to claim 1, wherein the third reflector is disposed to surround the periphery of the light source.

8. The backlight unit according to claim 1, wherein the inclined surface is at least one of a concavely inclined surface, a convexly inclined surface and a flat inclined surface.

9. The backlight unit according to claim 1, wherein the inclined surface of the second reflector overlaps with the first reflector.

10. The backlight unit according to claim 1, wherein the second reflector includes at least one horizontal surface and the horizontal surface of the second reflector is parallel to the first reflector.

11. The backlight unit according to claim 1, wherein the second reflector includes at least two inclined surfaces having at least one inflection point, and the first and second inclined surfaces adjacent to each other about the inflection point have different curvatures.

12. The backlight unit according to claim 1, further comprising an optical member spaced apart from the second reflector by a predetermined distance to define a space therebetween,
   wherein an air guide is defined in the space between the second reflector and the optical member.

13. The backlight unit according to claim 12, further comprising at least one of a reflective layer and a light scattering layer provided on a partial surface of the optical member.

14. The backlight unit according to claim 13, wherein the reflective layer includes a plurality of reflective layer parts, and the area of the respective reflective layer parts decreases with increasing distance from the light source.

15. The backlight unit according to claim 13, wherein the light scattering layer is made of $TiO_2$ and/or $Al_2O_3$.

16. The backlight unit according to claim 1, further comprising an optical member spaced apart from the second reflector by a predetermined distance to define a space therebetween,
   wherein a light guide plate is not hayed in the space between the second reflector and the optical member.

17. The backlight unit according to claim 1, wherein the light source includes a lens having at least one first surface, an incidence angle of which is equal to or greater than a critical angle, and at least one second surface, an incidence angle of which is less than the critical angle.

18. The backlight unit according to claim 17, wherein the lens is made of a polymer material having an index of refraction of 1 or more.

19. A backlight unit comprising:
   a first reflector;
   a second reflector partially having an inclined surface;
   a light source module disposed between the first reflector and the second reflector and having a plurality of light sources disposed on a board; and
   a third reflector disposed between adjacent light sources and configured to protrude from the board.

20. A display apparatus using a backlight unit, comprising:
   a display panel; and
   the backlight unit to project light to the display panel,
   wherein the backlight unit includes:
   a first reflector;
   a second reflector partially having an inclined surface;
   a plurality of light sources disposed between the first reflector and the second reflector; and
   a third reflector disposed between adjacent light sources.

* * * * *